(12) United States Patent
Hays et al.

(10) Patent No.: US 7,373,346 B2
(45) Date of Patent: May 13, 2008

(54) METHODS AND APPARATUS FOR IMPROVED SECURITY SERVICES

(76) Inventors: DeWayne L. Hays, 10738 Fallsbridge, Houston, TX (US) 77065; Robert Lewis Michaels, Jr., 1101 Music La., No. 304, Austin, TX (US) 78704; Arthur A. Vanderbilt, 704 Forest Tr., Cedar Park, TX (US) 78613

( * ) Notice: Subject to any disclaimer, the term of this patent is extended or adjusted under 35 U.S.C. 154(b) by 138 days.

(21) Appl. No.: 10/035,707

(22) Filed: Dec. 26, 2001

(65) Prior Publication Data
US 2003/0084033 A1 May 1, 2003

Related U.S. Application Data

(60) Provisional application No. 60/258,419, filed on Dec. 27, 2000.

(51) Int. Cl.
| G06F 7/00 | (2006.01) |
| G06F 17/30 | (2006.01) |
| G06F 15/00 | (2006.01) |
| G06F 11/00 | (2006.01) |
| G06F 15/02 | (2006.01) |
| G01D 9/00 | (2006.01) |
| G01D 15/04 | (2006.01) |
| G01D 15/20 | (2006.01) |
| G07C 1/00 | (2006.01) |
| G01D 9/28 | (2006.01) |
| G01D 9/36 | (2006.01) |

(52) U.S. Cl. .......... 707/10; 702/178; 702/188; 340/506; 346/20; 346/47; 346/80; 705/32

(58) Field of Classification Search .......... 707/3, 707/9, 10; 709/217; 702/178, 188; 340/506; 346/20, 47, 80; 705/32
See application file for complete search history.

(56) References Cited

U.S. PATENT DOCUMENTS

| 4,847,791 | A  * | 7/1989  | Martin et al. ............... 702/178 |
| 5,572,204 | A  * | 11/1996 | Timm et al. ................ 340/988 |
| 5,920,856 | A  * | 7/1999  | Syeda-Mahmood ........... 707/3 |
| 6,067,007 | A  * | 5/2000  | Gioia ................... 340/426.19 |
| 6,173,284 | B1 * | 1/2001  | Brown ........................ 707/10 |
| 6,370,582 | B1 * | 4/2002  | Lim et al. ................... 709/230 |
| 6,449,611 | B1 * | 9/2002  | Frankel et al. ................. 707/6 |
| 6,538,623 | B1 * | 3/2003  | Parnian et al. ................. 345/8 |
| 6,542,075 | B2 * | 4/2003  | Barker et al. ............... 340/506 |
| 2002/0069145 | A1* | 6/2002 | Collado et al. ............... 705/32 |
| 2003/0115023 | A1* | 6/2003 | Nickerson et al. .......... 702/188 |
| 2004/0024634 | A1* | 2/2004 | Carp et al. .................... 705/10 |

* cited by examiner

*Primary Examiner*—Wilson Lee
*Assistant Examiner*—Cheryl M Shechtman

(57) ABSTRACT

An apparatus and method for providing and/or obtaining security services includes a database of information which relates to security services provided for at least one client. A computer that is Internet accessible hosts the database. The database includes security data received from at least one security officer computer. The security data is entered into the at least one security officer computer by a security officer providing security services at a client location, and the security data corresponds with security related events occurring at the client location. The database is accessible by navigating a web browser to a website that is in data communication with the database. An authorization code is provided that permits access to the database. At least a portion of the information in the database is retrievable by providing a request via the website.

23 Claims, 49 Drawing Sheets

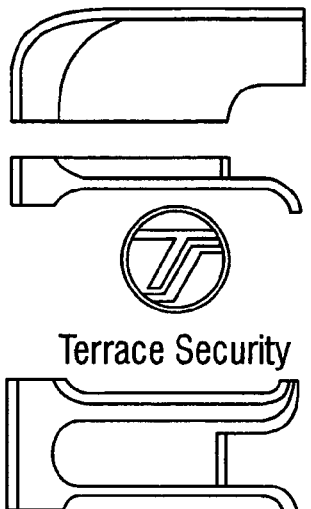

Terrace Security Corporation
Secured Reporting Console

Logged In: Borgman, Steve

Daily Activity Report

Shift 1

Guard
Calamari, Manni
Time In
10/12/2000 12:22:12 PM
Shift Code
dg
Comments
dzfgdzg

| Time In | Time Out | Code | Comments | IR |
|---|---|---|---|---|
| 1:00:00 AM | 1:00:00 AM | 2906 | dfgdfg | |
| 1:00:00 AM | 1:00:00 AM | 2918 | sdf | |

Post
Memorial City Mall
Time Out
10/12/2000 12:22:26 PM
Radio Number
dfg

Shift 2

Guard
Calamari, Manni
Time In
10/12/2000 5:03:26 PM
Shift Code
123
Comments
123

Post
Memorial City Mall
Time Out
10/12/2000 5:03:32 PM
Radio Number
123

| Time In | Time Out | Code | Comments | IR |
|---|---|---|---|---|
| 2:00:00 AM | 1:00:00 AM | 2927 | 123 | |

Shift 3

Guard
Calamari, Manni
Time In
10/12/2000 5:03:51 PM
Shift Code
123
Comments
12312312312321

Post
Memorial City Mall
Time Out
10/12/2000 5:04:54 PM
Radio Number
123

| Time In | Time Out | Code | Comments | IR |
|---|---|---|---|---|
| 4:00:00 AM | 3:00:00 AM | 2907 | 123123 | |

*FIG. 11A*

Shift 4
Guard
Calamari, Manni
Time In
10/12/2000 5:05:04 PM
Shift Code
sfe
Comments
asdfasd Post
Memorial City Mall
Time Out
10/12/2000 5:05:08 PM
Radio Number
sdf

| Time In | Time Out | Code | Comments | IR |
|---|---|---|---|---|

Shift 5
Guard
Calamari, Manni
Time In
11/16/2000 8:22:58 PM
Shift Code
Comments Post
Memorial City Mall
Time Out
11/17/2000 11:38:04 AM
Radio Number

| Time In | Time Out | Code | Comments | IR |
|---|---|---|---|---|
| 1:00:00 AM | 1:00:00 AM | 1607 | | |
| 1:00:00 AM | 1:00:00 AM | 1601 | | |
| 1:00:00 AM | 1:00:00 AM | 1603 | | |
| 1:00:00 AM | 1:00:00 AM | 1603 | | |
| 1:00:00 AM | 1:00:00 AM | 1603 | | |
| 1:00:00 AM | 1:00:00 AM | 1603 | | Y |
| 1:00:00 AM | 1:00:00 AM | 1604 | | |
| 1:00:00 AM | 1:00:00 AM | 1605 | | |

Shift 6
Guard
Calamari, Manni
Time In
11/17/2000 11:38:10 AM
Shift Code
412
Comments Post
Memorial City Mall
Time Out
11/17/2000 11:40:56 AM
Radio Number
234

| Time In | Time Out | Code | Comments | IR |
|---|---|---|---|---|
| 1:00:00 AM | 1:00:00 AM | 1615 | qwe | |
| 1:00:00 AM | 1:00:00 AM | 1600 | | |

Shift 7
Guard
Calamari, Manni
Time In
11/17/2000 11:41:05 AM
Shift Code
SDF
Comments
xsg Post
Memorial City Mall
Time Out
11/20/2000 8:01:52 AM
Radio Number
asf

| Time In | Time Out | Code | Comments | IR |
|---|---|---|---|---|

*FIG. 11B*

Shift 8
Guard  Post
Calamari, Manni  Memorial City Mall
Time In  Time Out
11/20/2000 8:02:02 AM  11/21/2000 3:12:03 PM
Shift Code  Radio Number
tewt  tet
Comments
asretae

| Time In | Time Out | Code | Comments | IR |
|---|---|---|---|---|
| 2:03:00 AM | 5:00:00 AM | 1604 | comment | Y |

Shift 9
Guard  Post
Calamari, Manni  Memorial City Mall
Time In  Time Out
11/21/2000 3:12:18 PM  11/21/2000 3:17:34 PM
Shift Code  Radio Number
wer  werwer
Comments
erwer

| Time In | Time Out | Code | Comments | IR |
|---|---|---|---|---|
| 1:00:00 AM | 2:00:00 AM | 1610 | comments | Y |
| 5:00:00 AM | 6:00:00 AM | 1607 | ar | Y |
| 5:00:00 AM | 6:00:00 AM | 1607 | ar | Y |

Shift 10
Guard  Post
Calamari, Manni  Memorial City Mall
Time In  Time Out
11/21/2000 3:56:21 PM  11/21/2000 4:07:48 PM
Shift Code  Radio Number
we  wet
Comments
qr

| Time In | Time Out | Code | Comments | IR |
|---|---|---|---|---|
| 1:00:00 AM | 1:00:00 AM | 1607 | comment | Y |
| 8:00:00 AM | 9:00:00 AM | 1604 |  | Y |
| 1:00:00 AM | 1:00:00 AM | 1605 | comment goes here... | Y |
| 1:00:00 AM | 1:00:00 AM | 1600 |  | Y |
| 1:00:00 AM | 1:00:00 AM | 1600 |  | Y |

Shift 11
Guard  Post
Calamari, Manni  Memorial City Mall
Time In  Time Out
11/21/2000 9:09:58 PM  11/22/2000 9:20:43 AM
Shift Code  Radio Number
wr3  wer
Comments
wrwaer

| Time In | Time Out | Code | Comments | IR |
|---|---|---|---|---|

*FIG. 11C*

[Shift 12]

Guard  
Calamari, Manni  
Time In  
10/12/2000 5:03:38 PM  
Shift Code  
123  
Comments  
123123

Post  
property 1  
Time Out  
10/12/2000 5:03:43 PM  
Radio Number  
123

| Time In | Time Out | Code | Comments | IR |
|---|---|---|---|---|
| 7:00:00 AM | 6:00:00 AM | 2940 | 12312321 | |

[Shift 13]

Guard  
Calamari, Manni  
Time In  
11/22/2000 9:21:02 AM  
Shift Code  
1234  
Comments  
comment goes here Post  
property 1  
Time Out  
11/22/2000 9:24:03 AM  
Radio Number  
12345

| Time In | Time Out | Code | Comments | IR |
|---|---|---|---|---|
| 1:00:00 AM | 1:00:00 AM | 1601 | comments for the event go here | Y |

Terrace Security Corporation
Online Applications Management Console

Logged In: Borgman, Steve

Officer Admin

| Last Name | First Name | Badge # | Bio |
|---|---|---|---|
| ⦿ Calamari | Manni | 111 | Cobol Teacher ～1210 |
| ○ Melancon | Robb | 555 | |
| ○ Officer | New | 999 | editreee |
| ○ Samson | Freddie | 333 | Me |
| ○ Waggoner | Ian | 19 | |
| ○ Whipple | Steve | 222 | |

[ Edit Selected Officer >> ] ～1220

~OR~

[ Add New Officer ] ～1240

[ Delete Selected Officer ] ～1230

Terrace Security

Officers
Clients
Users
Log Out

Terrace Security Corporation
Online Applications Management Console

Logged In: Borgman, Steve

User Admin

| Last Name | First Name | User ID | Admin |
|---|---|---|---|
| ⦿ Borgman | Steve | steve | Yes |
| ○ Hays | Wayne | wayne | Yes |
| ○ Madison | Carmen | carm | Yes |
| ○ Marcis | Doug | doug | Yes |
| ○ Michaels | Bob | bob | Yes |
| ○ Vanderbilt | Arthur | arthur | Yes |
| ○ Waggoner | Ian | ian | Yes |

1410

Edit Selected User >>  — 1420

Delete Selected User — 1430

~OR~

Add New User — 1440

Terrace Security
Officers
Clients — 1450
Users
Log Out

*FIG. 14*

Terrace Security Corporation
Officer Console

Logged In: Neely, Bernard

Incident Report

TSC Case #
8

HPD Case #

Incident Code/Type
1605 - Aggravated Robbery
Location

Date/Time Reported
12 / 30 / 2000   12 : 00   ⊙ AM ○ PM

Date/Time Occurred
12 / 30 / 2000   12 : 00   ⊙ AM ○ PM

HFD Unit #      What Hospital      Paramedic's Name

Indentifying Information #1
⊙ SU  ○ C  ○ W        Last Name      First Name      MI

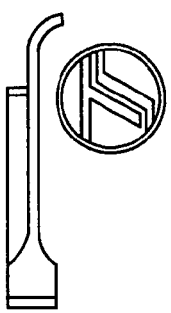

Terrace Security

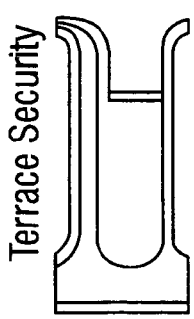

Clock In/Out
Enter Events
View DAR
Submit DAR
Log Out

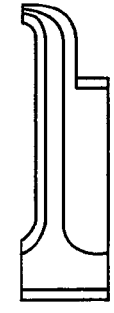

Employer [          ]

Suspect is Minor  ○ Yes  ⊙ No     Parent/Guardian Notified  ○ Yes  ⊙ No     By Whom [     ]     Name of Notified [     ]     Time [12▶] : [00▶]     ⊙ AM  ○ PM Department/Property [          ]

Indentifying Information #3

⊙ SU  ○ C  ○ W

Residence Phone [     ]     Last Name [     ]     First Name [     ]     MI [  ]

Business Phone [     ]     DOB [12▶] / [30▶] / [2000▶]

Address [     ]     SSN [     ]     DL [     ]

Employer [     ]     Department/Property [     ]

NARRATIVE

Write a summary of the incident, answering the questions Who, What, When, Where & Why.

FOLLOW-UP

Date: 12 / 30 / 2000

Time: 12 : 00  ● AM  ○ PM

By Whom submit

*FIG. 15E*

II. THE COMPLAINTANT - Check one: ☐ Tenant ☐ Visitor ☐ Contractor ☐ Employee:
Complete Sections I, II, VII & IX Last Name: [____] First Name: [____] ☐ Male ☐ Female Address: [____] SSN: [____]

City: [____] State: [____] Zip: [____] Phone #: ([____])[____]

Physical Disabilities:

Age: [____] Height: [____]' [____]" Weight: [____]

Pregnant? ☐ Yes ☐ No  If yes, how many months [1 ▶]

Does Complaintant wear glasses? ☐ Yes ☐ No  If yes, what kind [____]

Place of Employment: [____] Position: [____]

Address: [____]

City: [____] State: [____] Zip: [____] Phone #: ([____])[____]

*FIG. 16B*

Driver's Liscense # [ ] State: [ ] Date of Expiration : [01▸]/[01▸]/[2000▸]

Vehicle Description: [ ] License Plate # : [ ] State: [ ]

Vehicle Insurance?: [ ] Yes [ ] No  Insurance Company: [ ]

Policy # [ ] Policy Holder: [ ]

III. FIRST AID (treatment Rendered to stabalize Complaintant)

[ ] Offered [ ] Not Offered - why? [ ]

[ ] Offer Declined  By whom; why? [ ]

[ ] Taken to Hospital  Hospital Name? [ ]

Taken by: [ ] Ambulance  HFD Unit # [ ]  Paramedic's Name [ ]

*FIG. 16C*

☐ Self  ☐ Other, Explain: _____

Taken at Whose Request?  ☐ Complaintant  ☐ Other, Explain: _____

Emergency Contact Notified?  ☐ Yes  ☐ No  ☐ N/A  Name of Contact: _____

IV. CONDITION OF THE COMPLAINANT (For SLIP/FALL INCIDENT Only)

A. <u>BEFORE the Incident</u>

Carrying anything?  ☐ Yes  ☐ No  If yes, what was being carried? _____

B. <u>AFTER the Incident</u>
Describe any visible injury or damage to clothing

Complainant's description of any injury and where on their body it's located

*FIG. 16D*

Describe Complainant's reaction to the incident

Describe shoes worn by Complainant

Sole materials: ○ Leather ○ Rubber ○ Vinyl ○ Wood ○ Other-describe

Describe heels (height, material, condition):

Overall condition of shoes: ○ Good ○ Average ○ Poor

V. INCIDENT INVOLVING MINORS
Was the minor accompanied by anyone at the time of the Incident? ○ Yes ○ No  If yes, who?

Relationship to Minor

*FIG. 16E*

If unaccompanied, was someone responsible for the minor?  ○ Yes  ○ No   If yes, who?

Relationship to Minor

Where was this person at the time of the incident?

VI. INCIDENT DESCRIPTION

Complainant's detailed description of how the incident occurred (what does the Complainant feel *caused* the incident?). If the Complainant is unable to tell you what happened, reconstruct as much as you can from physical evidence or witnesses-do not assume any facts about the incident.

A. Description of the Incident Site

1. Type of Walkway:

○ Floor  ○ Stairway  ○ Ramp  ○ Street  ○ Escalator  ○ Parking Lot  ○ Other-describe 2. Surface material:

*FIG. 16F*

○ Carpet ○ Vinyl tile ○ Ceramic tile ○ Terrazo ○ Marble ○ Quarry Tile ○ Rug
○ Grass ○ Concrete ○ Asphalt ○ Gravel ○ Metal ○ Dirt ○ Other-describe

[          ]

3. Foreign substance present? (Soda, water, ice, snow, etc.) ○ Yes ○ No

What does substance appear to be?
[          ]

Describe substance: Color
[   ]

Odor
[   ]

Amount
[    ]

Spill pattern
[     ]

Describe: Texture
[      ]

*FIG. 16G*

_____ (melted, crushed, solid, etc.) Consistency

4. Skid/streak marks ○ Yes ○ No   Substance on shoes or clothing ○ Yes ○ No

How did substance come to be on the floor? _____

5. Any other object involved? ○ Yes ○ No   If yes, describe object/composition _____

Location of object _____

Reason for location of object _____

Anything unusual about object? _____
(broken, unstable, not in usual place, etc.)

B. <u>Unusual Surface Conditions Present?</u> ○ Yes ○ No   If yes, describe nature of condition _____

*FIG. 16H*

Dimensions _____ Debris present? ○ Yes ○ No  If yes, describe
_____

C. Lighting Conditions

1. ○ Natural  ○ Artificial-describe _____
(type of bulb, etc.)

2. Does the complainant feel that lighting was a contributing factor in causing the incident?
○ Yes  ○ No  If yes, explain _____

D. Weather Conditions
Describe outdoor weather, even if incident was inside _____
(cloudy, sunny, snowing, raining, etc.)

VII. PHOTOGRAPHS

Were photos taken? ○ Yes ○ No  How many? _____

*FIG. 16I*

By whom? [_____]

Date & Time Taken [_____] Where are photos stored? [_____]

VIII. WITNESSES

Ask the following questions to each person at or near the incident scene. Include all people who might have seen the complainant or the scene shortly before, during or just after the incident.

A.
Name [_____] Address [_____]

City [_____] State [_____]

Zip [_____]

Phone # [_____]

What was this person's involvement with the incident? [_____]

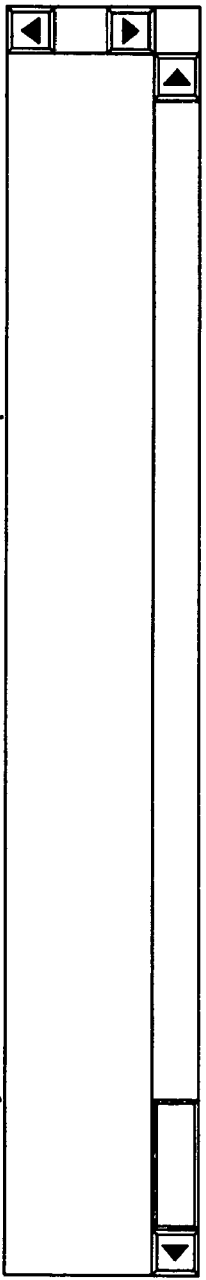
FIG. 16N

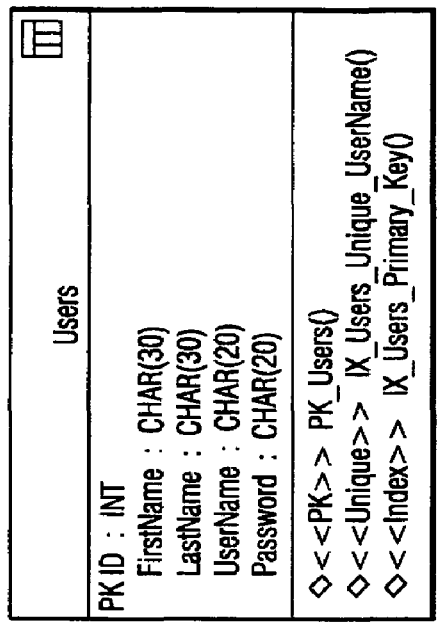
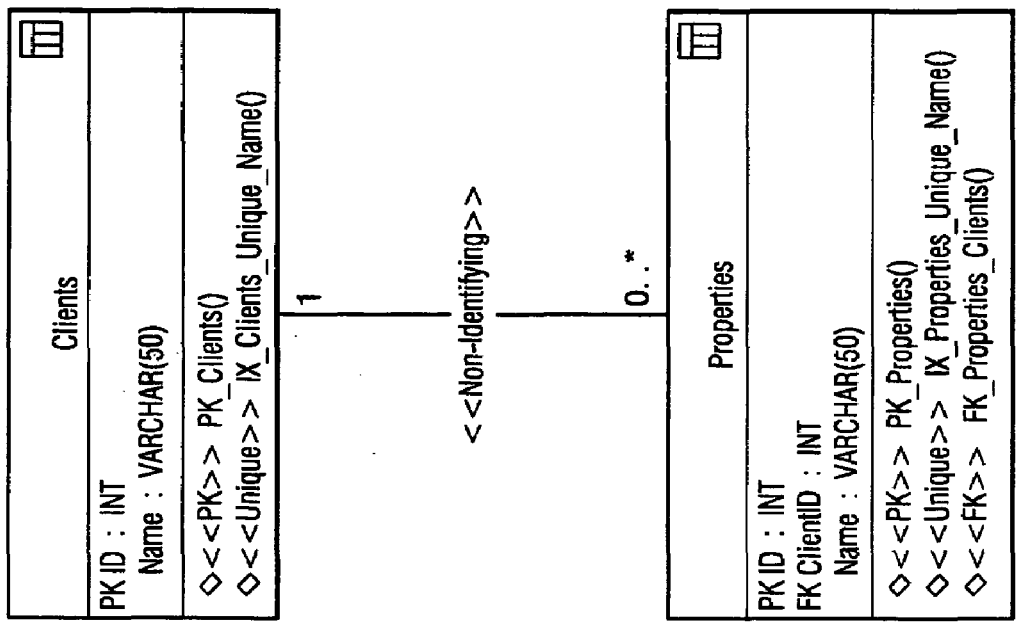
FIG. 19A

Error Logging

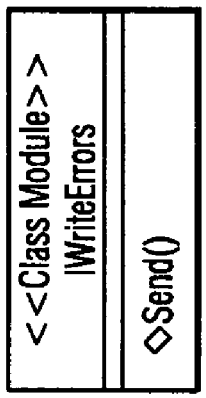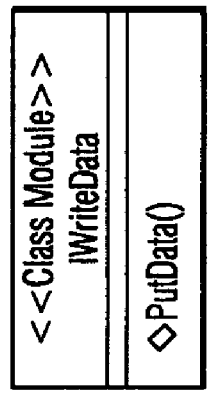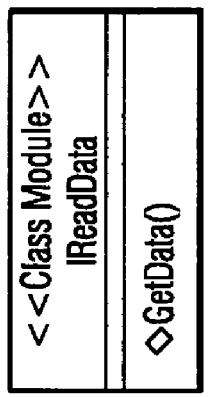
FIG. 19F
Interfaces and Event Classes

DNA Payload

Component Diagram

METHODS AND APPARATUS FOR IMPROVED SECURITY SERVICES

CROSS-REFERENCE TO RELATED APPLICATIONS

This application claims priority to U.S. provisional patent application Ser. No. 60/258,419 filed Dec. 27, 2000.

FIELD OF THE INVENTION

This invention relates to methods and apparatus for providing and obtaining security services. More particularly, this invention relates to methods and apparatus for security services in a manner intended to improve the speed and efficiency, as well as the quality and quantity, of the information provided to and obtained by customers of security services, as well as the interaction between the customer and the personnel providing the security services, and to improve customer satisfaction through customer interaction in initial program development and provide improved security services.

BACKGROUND OF THE INVENTION

Conventional approaches to security services often involve uniformed personnel. Such personnel may have varying degrees of training before actually working on site at a location where security services are needed. Most, if not all, aspects of such personnel are determined by the company which contracts with a property owner or manager to provide such personnel to provide such security services. Thus, with conventional security services, the service provider determines who will serve a security personnel for a particular client or at a particular site, what training such personnel will have before providing services to the client or at the site, what uniforms will be worn by such personnel, and so forth.

In addition to uniformed security officers who patrol a client's premises and thereby provide security services, conventional security services can include visual surveillance and monitoring. Such conventional visual monitoring can include the use of cameras at preselected locations in or around a client's premises or facility. Such cameras can provide visual images to a remote location where a security officer can monitor them. Such a location can be a remote command center. In addition, such conventional systems allow the cameras to automatically sweep from side-to-side, or to respond to directions from a security officer for side-to-side or up-and-down movement, to thereby increase the camera's field of vision.

Conventional approaches to providing security services have several drawbacks. First, the speed and efficiency with which information regarding the security services is provided is often undesirable. For example, a conventional approach is to have an officer who provides security services prepare a written daily report summarizing the services and events of a given day that are relevant to the security services provided to a particular client site. Such reports are typically prepared in a handwritten form, typed up later in a paper form, and then provided to the client with many other daily reports from other security officers, other locations, and perhaps even daily reports for other days. The client who receives reports in this conventional manner must first wait for several days to several weeks before receiving them and, once they are received, must then read through them and figure out what, if any, information should be cataloged and possibly filed for later use. This same conventional approach also typically applies to the preparation and provision of incident reports, which are conventional for reporting on an incident, such as a break-in, fire, injury, theft, assault, or any other type of even that a client might be interested in monitoring and recording. This conventional approach to security services thus delays a client's access to such reports, and makes it difficult and costly for the client to maintain copies of the reports and/or the information provided in the reports for possible later use.

In addition, personnel turnover at companies which use such conventional methods tends to be rather high. The turnover rate for contracts between the security service companies and their clients tends to be rather high. Third, even effective security services do not necessarily result in customer satisfaction or increased loyalty. Security services which reduce crime rates to little or no crime are not necessarily enough to prevent high rates of contract turnover or employee turnover.

Many recent advances in technology have not been applied to improve the conventional approach to providing security services. For example, the Internet is not used to provide security services. The Internet essentially consists of a network of computers, often connected through telephone lines (although sometime connected through other means, such as fiber-optic cables, wireless radio signals, infrared signals, and the like). Computer files on computers connected to the Internet can be accessed by other users of the Internet. Information stored on the computers connected to the Internet is usually lodged in files called web pages, which can include printed matter, sounds, pictures, video clips, and links to other files and web pages. Such web pages are typically formatted so that a user can place a cursor over an icon relating to a given file, and then access that file by clicking once.

Electronic commerce over the Internet has progressed significantly. For example, Amazon.com, Inc., which has grown into a major corporation, began by selling books to the consumers over the Internet with delivery of the books by a delivery service. U.S. Pat. No. 5,960,411 is assigned to Amazon.com and describes a method and system for placing a purchase order via a communications network. The patent describes how a consumer can click on a button in a web site in order to place an order for an item. U.S. Pat. No. 5,960,411 is hereby incorporated by reference.

U.S. Pat. No. 5,794,207, assigned to Walker Asset Management Limited Partnership, is entitled as a method and apparatus for a cryptographically assisted commercial network system designed to facilitate buyer-driven conditional purchase offers. The patent purports to allow prospective buyers of goods and services to communicate a binding purchase offer globally to potential sellers, for sellers to search for relevant buyer purchase offers, and for sellers potentially to bind a buyer to contract based on the buyer's purchase offer. U.S. Pat. No. 5,794,207 is hereby incorporated by reference.

The methods and apparatus used to provide conventional security services have not taken advantage of the benefits of the Internet and its growing use. Instead, conventional security service providers have used the Internet simply to provide promotional and marketing information about themselves and their services to potential customers.

Other improvements in technology have not been used in conventional methods and apparatus for providing security services. For example, certain types of wireless devices (such as "walkie-talkies") have been used in conventional security services for many years. However, the widespread and relatively cheaply available cellular phones, personal digital assistants, and other devices which allow a mobile person to receive Internet web pages, e-mail, or other information from other computers or similar devices at remote locations, have not been used in conventional methods or apparatus for providing security services. Similarly, the Internet allows users to remotely access web sites which may contain various types of information, including video or audiovisual feeds from cameras at a remote location. Nonetheless, the use of the Internet and its capabilities have not been integrated into conventional methods or apparatus for providing security services. Conventional security services also have not provided a "paperless" approach to providing information to clients. As a result, conventional security services are more costly, inefficient, less timely, and less valuable and helpful than they should be.

SUMMARY OF THE INVENTION

In one aspect of the invention, the security services include the use of remote cameras at predetermined locations at and/or around a client site, with the visual images and/or audiovisual footage from such cameras fed to a computer linked direct to a web site on the Internet and accessible through the Internet, and which is remotely accessible by the client, thereby allowing the client to view the camera feeds essentially live. In yet another aspect of the invention, a secure connection to a web site, such as the security service provider's web site, accessible via the Internet is provided, with the web site containing various information regarding client properties, such as daily reports, incident reports, digital pictures, digital video clips, and the like. In still another aspect of the invention, a client database is maintained that is searchable, such as by date, location, type of incident, or the like, and is accessible by a client via the Internet. In yet another aspect of the invention, a security officer "clocks in" when starting a shift by entering appropriate information into a computer connected to the Internet. When the security officer has completed his or her shift, the officer then logs off (or "clocks out") by entering a second appropriate code or set of information into a computer connected to the Internet. In still another aspect of the invention, client involvement in the hiring process is provided. In addition, the invention provides for client input into various aspects of the security services and how they are provided, including the training process and the manner in which the security services are to be provided. Another aspect of the invention involves profiling the personality characteristics of the candidate security officers to provide the security services for a particular client, and then matching those security officers with appropriate personality characteristics to a personality profile of an "ideal" candidate, as determined by the client and the client's needs.

It is an object of the invention to provide apparatus and methods for providing security services that allow a client to remotely monitor information regarding the security services provided to the client from a remote location, such as a computer connected to the Internet.

It is yet another object of the invention to provide apparatus and methods for providing security services that allow a client to send wireless messages to a security officer.

It is still another object of the invention to provide apparatus and methods for providing security services that allow a client to quickly receive security information from a security services provider.

It is another object of the invention to provide apparatus and methods for a security officer to "clock in" at the beginning of a shift (or other work period) and/or "clock out" at the end of a shift (or other work period) via a computer connected remotely, such as via the Internet, to a central computer.

It is another object of the invention to provide methods for providing security services that involve client input into the selection of the individuals selected to provide security services to the client.

It is another object of the invention to provide methods for providing security services that involve client input in the development of the training program as well as the officer being certified trained by the client with a client signed certificate issued to the officer training of individuals selected to provide security services to the client.

These and other aspects and advantages of the present invention will become readily apparent to those skilled in the art from the following detailed description of the invention and from the attached drawings, which are briefly described below.

BRIEF DESCRIPTION OF THE DRAWINGS

FIGS. 11A-11D are printouts of computer screens from a web site in accordance with a preferred embodiment of the present invention.

FIG. 12 is a printout of a computer screen from a web site in accordance with a preferred embodiment of the present invention.

FIG. 14 is a printout of a computer screen from a web site in accordance with a preferred embodiment of the present invention.

Figure 15B:
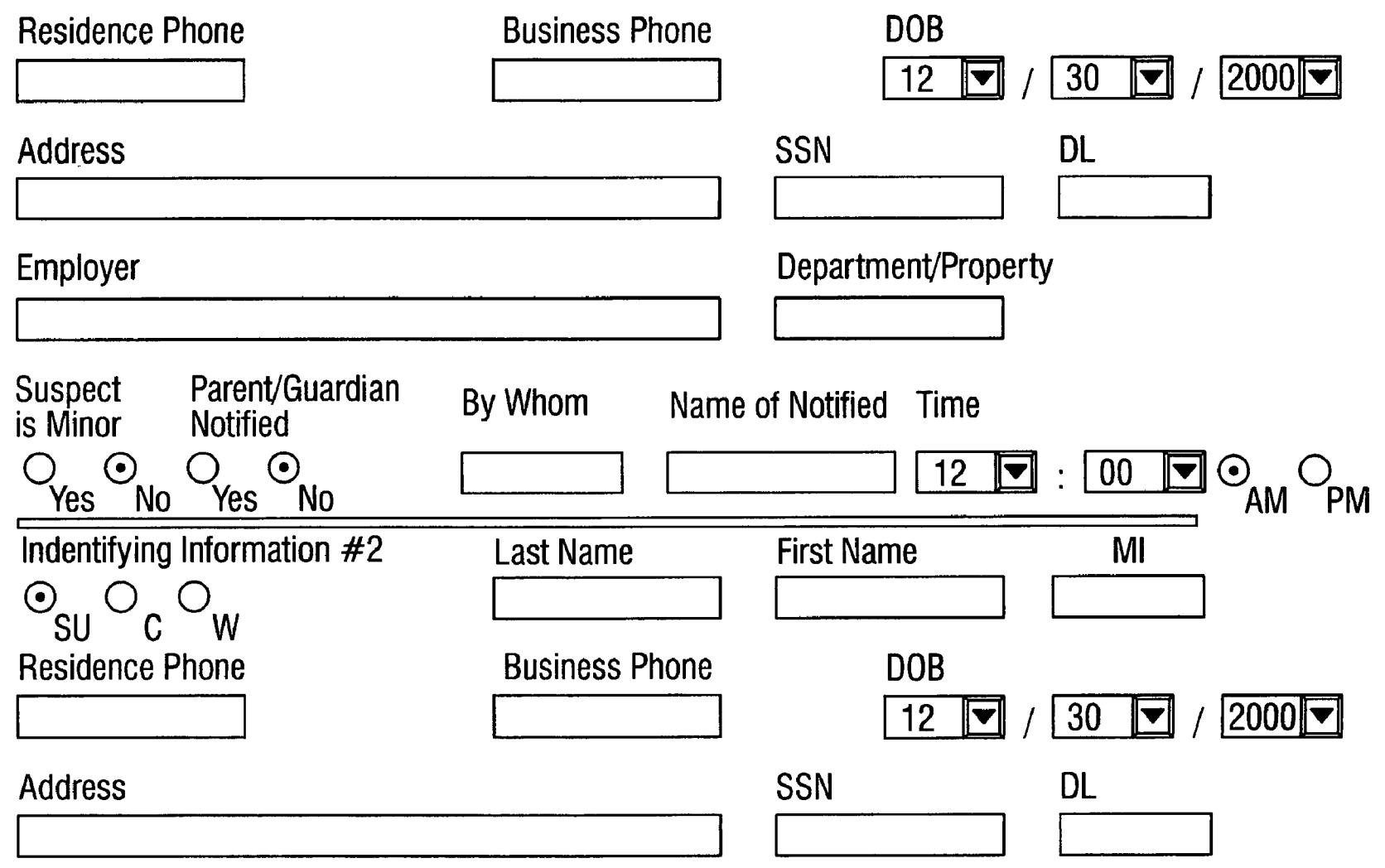
Figure 15D:
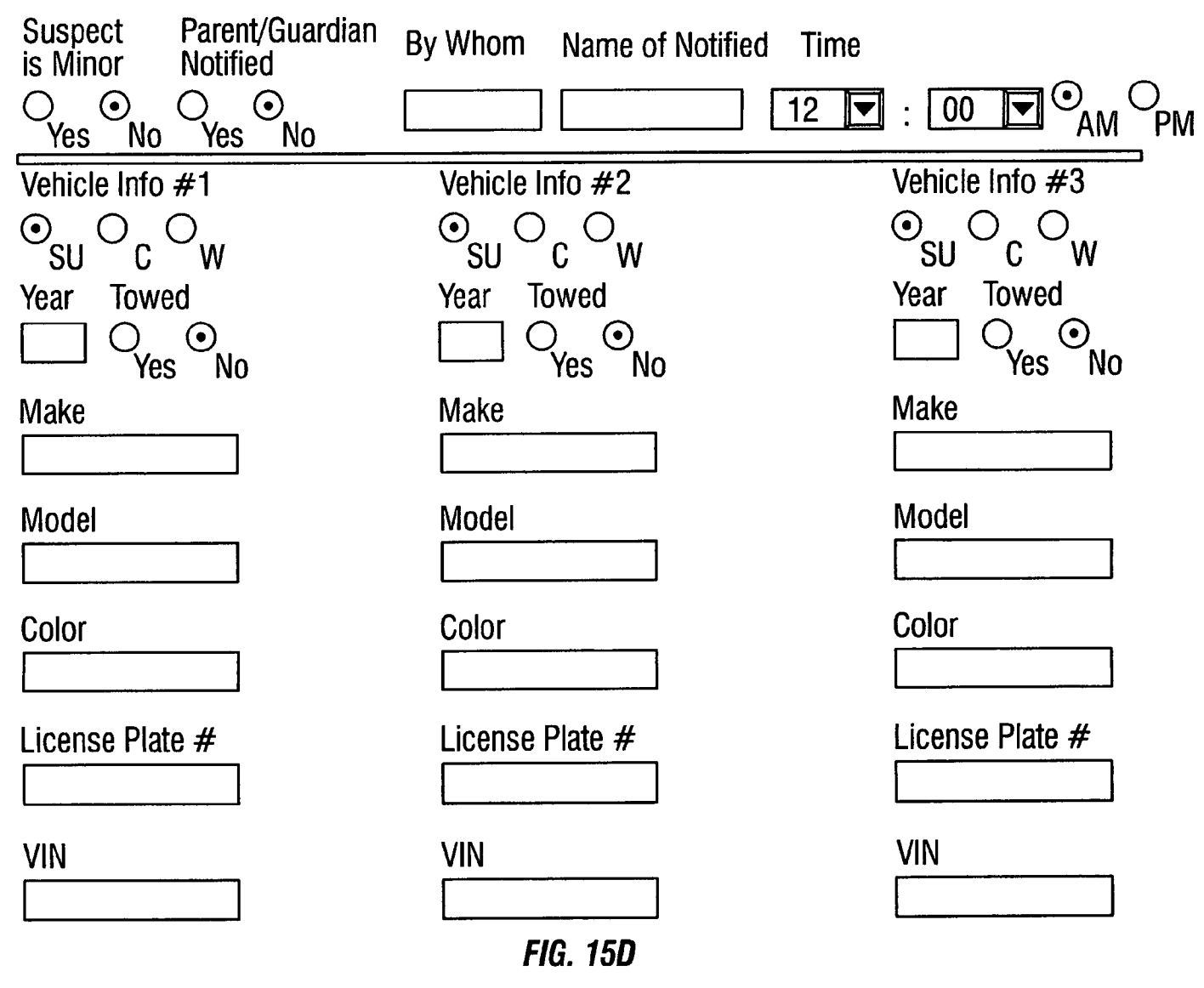

FIGS. 15A-15E are printouts of a computer screen of the web site in accordance with a preferred embodiment of the present invention.

FIG. 19A-19H are documentation describing the computer software and database of the web site in accordance with a preferred embodiment of the present invention.

DETAILED DESCRIPTION OF THE INVENTION

Figure 1:
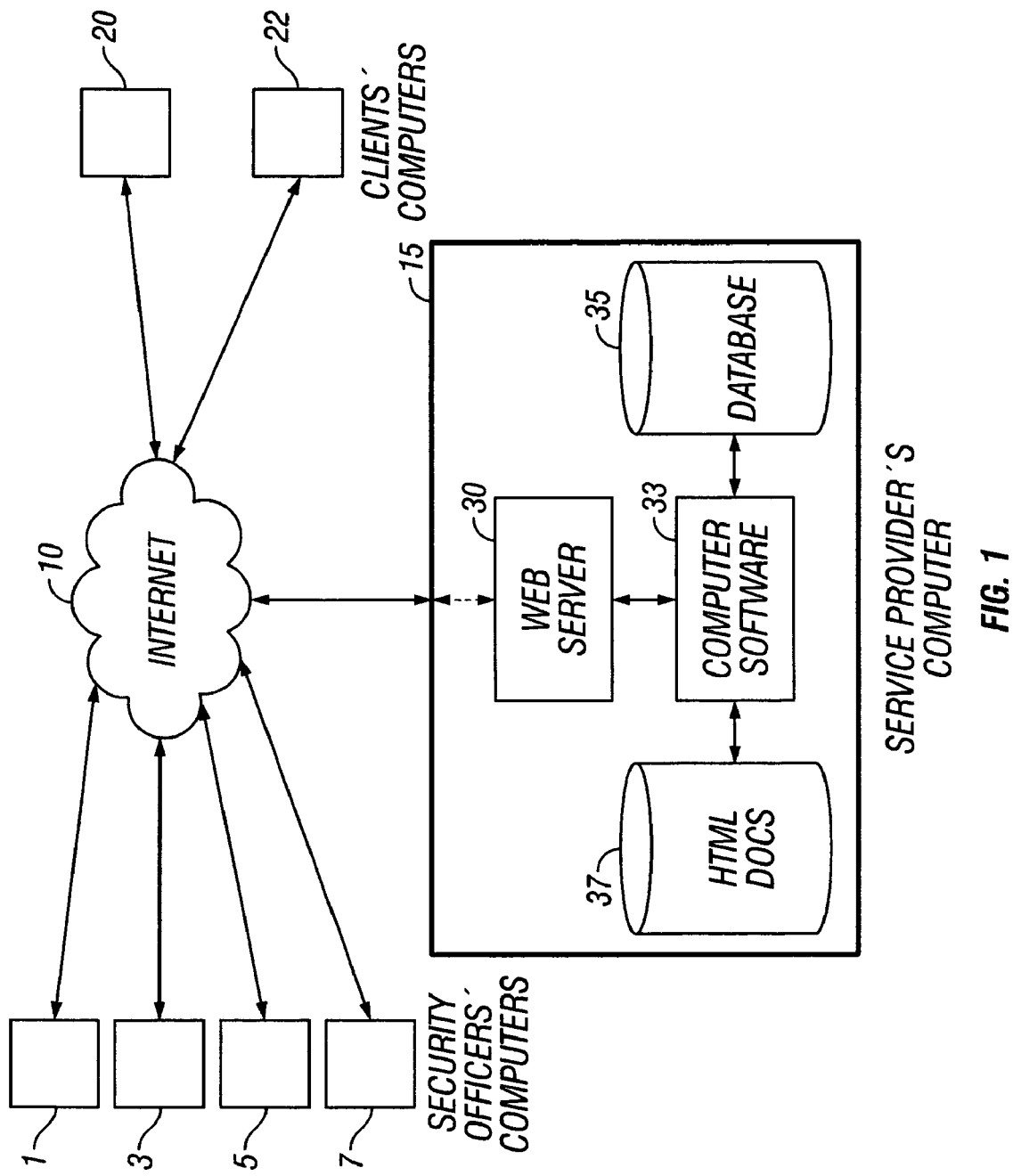
FIG. 1 is a block diagram showing the components of an apparatus in accordance with a preferred embodiment of the invention.

The present invention provides apparatus and methods relating to providing and obtaining security services. For convenience, the following Detailed Description of the Invention includes the following sections: (1) Glossary of Terms; (2) Description of the Web Aspects of the Invention; (3) Description of Other Aspects of the Invention; and (4) Conclusion.

1. Glossary of Terms

Although various terms may be defined elsewhere herein, the following glossary of terms is provided to assist in a better understanding of the present invention:

Client. A "client" of security services can be a separate person or company with whom the security service provider contracts. A "client" can also be a division, department, or facility of the same company providing such security services. It will be understood that a "client" may have numerous properties or facilities for which security services are provided. In addition, it will be understood that a "client" may be a corporation or other legal entity, or a division or unit of a corporation or other legal entity, and there may be one or any number of individuals employed by or otherwise representing that entity and who act for the client.

Client-Server. A model of interaction in a distributed computer system in which a computer program at one site sends a request to a computer program at another site and waits for a response. The requesting program is called the "client," and the program which responds to the request is called the "server." In the context of the World Wide Web (discussed below), the client is a "Web browser" (or simply "browser") which runs on a computer of a user; the program which responds to browser requests by serving Web pages is commonly referred to as a "Web server."

Hyperlink. A navigational link from one document to another, or from one portion (or component) of a document to another. Typically, a hyperlink is displayed as a highlighted word or phrase that can be selected by clicking on it using a mouse (or similar device) to jump to the associated document or document portion. As used herein, a hyperlink may also include buttons or icons displayed on a screen that, when clicked on by the user, take the user to the next appropriate web page (i.e., jump to the HTML document which corresponds to the button or icon).

Hypertext System. A computer-based informational system in which documents (and possibly other types of data entities) are linked together via hyperlinks to form a user-navigable "web."

Internet. A collection of interconnected (public and/or private) computer networks that are linked together by a set of standard protocols (such as TCP/IP and HTTP) to form a global, distributed computer network. (While this term is intended to refer to what is now commonly known as the Internet, it is also intended to encompass variations which may be made in the future, including changes and additions to existing standard protocols.)

World Wide Web ("Web"). This term is used herein to refer generally to both (i) a distributed collection of interlinked, user-viewable hypertext documents (often referred to as Web documents or Web pages) that are accessible via the Internet, and (ii) the client and server software components which provide a user with access to such documents using standard Internet protocols. Currently, the primary standard protocol for allowing applications to locate and acquire Web documents is HTTP, and the Web pages are encoded using HTML. However, the terms "Web" and "World Wide Web" are intended to include other computer programming languages and transport protocols which may be used in place of (or in addition to) HTML and HTTP, both today and in the future.

Web Site. A computer system that serves informational content (including without limitation text, pictures, video, audio and/or audiovisual information) over a network using the standard protocols of the World Wide Web. Typically, a Web site corresponds to a particular Internet domain name, such as "terracesecurity.com," and includes content associated with a particular organization. As used herein, the term Web Site is generally intended to include both (i) the hardware/software server components that serve the informational content over the network, and (ii) the "back end" hardware/software components, including any non-standard or specialized components, that interact with the server components to perform services for Web site user.

HTML (HyerText Markup Language). A standard computer software programming convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to parse and display the document. HTML tags also can be used to create links to other Web documents (commonly referred to as "hyperlinks"). For more information on HTML, see Ian S. Graham, *The HTML Source Book*, John Wiley and Sons, Inc., 1995 (ISBN 0471-11894-4), which is incorporated by reference herein.

HTTP (HyerText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET<URL>, causes the server to return the document or file located at the specified URL.

URL (Uniform Resource Locator). A unique address which fully specifies the location of a file or other resource on the Internet. The general format of a URL is <protocol://machine address;port/path;filename>. The port specification is optional, and if none is entered by the user, the browser defaults to the standard port for whatever service is specified as the protocol. For example, if HTTP is specified as the protocol, the browser will use the HTTP default port of 80.

Cookies. A technology that enables a Web server to retrieve information from a user's computer that reveals prior browsing activities of the user. The informational item stored on the user's computer (typically on the hard drive) is commonly referred to as a "cookie." Conventional Web browsers support the use of cookies.

PUSH Technology. An information dissemination technology used to send data to users over a computer network. In contrast to the World Wide Web (which consists primarily of "pull" technology), in which the client browser must request a Web page before it is sent, PUSH technology includes protocols to send the informational content to the user computer automatically, typically based on information pre-specified by the user.

2. Description of the Web Aspects of the Invention

Referring first to FIG. 1, a block diagram showing the various components of the apparatus used to provide security services in accordance with the invention is shown. A series of computers 1, 3, 5, and 7 are provided. Computers 1, 3, 5, and 7 can be located at various locations, remote from one another and at locations remote from computers 15, 20, and 22 as well. Each of the computers 1, 3, 5, and 7 is connected to the Internet 10 by conventional means, such as telephone lines. Each of the computers 1, 3, 5, and 7 can be any one of a number of conventional personal computers, such as those made by DELL COMPUTER, COMPAQ COMPUTER, and others. For best results, we prefer to use computers with a PENTIUM III microprocessor, such as those commercially available from Intel, in a Dimension XPSD computer from Dell Computer Corporation. In accordance with the present invention, computers 1, 3, 5, and 7 are loaded with software which allows a user to easily connect to the Internet 10 and to easily send and receive information via the Internet 10. For best results, we prefer to use commercially available "browser" software, such as Internet Explorer (version 5 or higher) from Microsoft Corporation. Because we prefer to allow the computers 1, 3, 5, and 7 to be easily used for a variety of things, such as preparing and editing reports, we prefer to use Internet Explorer version 5 or higher, which is commercially available from Microsoft Corporation.

Still referring to FIG. 1, a security service provider's computer 15 is also connected to the Internet 10, as are client computers 20 and 22. As shown in FIG. 1, computer 15 includes a web server 30, computer software 33, a database 35 which can contain various information regarding security services, such as the officers, clients, client properties, daily activity reports, incident reports, and the like, and a database of HTML documents 37. The computer software 33 is programmed to run the web server 30 to provide a web site of the security service provider. The web server 30 thus provides information to visitors of the web site from the HTML doc database 37 and the database 35. In a preferred embodiment of the invention, computer 15 is a Compaq Proliant server, which is commercially available, which uses Windows 2000 (which is commercially available from Microsoft) as its operating system. The computer 15 is used to store information received from computers 1, 3, 5, and 7 in a database 35. In addition, a service provider can use computer 15 to edit information received from computers 1, 3, 5, and 7 and stored in database 35. Moreover, a user of computer 15 can receive information from a client of security services located at a remote location, such as a user of computers 20 or 22, and can then relay such information to users of computers 1, 3, 5, and 7. For example, a client can use computer 20 to send a request for additional information regarding a particular client property. That request is received via the Internet 10 by computer 15. The computer software 33 running on computer 15 can be programmed to automatically route certain requests for information from the client to the appropriate user of computers 1, 3, 5, or 7, or can be acted upon by a user of computer 15.

The benefits of the present invention can be seen by the following illustration of the operation of the apparatus and methods just described. Suppose that a security officer prepares an incident report in connection with an activation of a sprinkler system at a particular location of an apartment complex on a particular day. In accordance with the present invention, the security officer can use computer 1 to prepare an incident report (or can report on the incident in a daily activity report) using conventional software, such as Word 2000, which is commercially available from Microsoft Corporation. Computer 1 may be located at the apartment complex where the incident occurred; thus, computer 1 may be in a different city, state, or even country from the physical location of computers 15, 20, or 22. The security officer can e-mail the incident report (again using conventional software such as Microsoft Outlook Express) from computer 1 to computer 15 via the Internet 10. The computer software 33 is programmed to automatically update the database 35 by including the new incident report in the portion of the database 35 associated with that particular client. The client can then access computer 15 via the Internet 10 from computer 20 and, using conventional browser software (such as that commercially available from Netscape or Microsoft), can download portions of the database 35 from computer 15 and view on computer 20 the new incident report.

If the client in this example has questions regarding the incident, the client can send an e-mail with the questions from computer 20 via the Internet 10 to computer 15. Similarly, if the client wants more information regarding the incident, such as pictures of the site or any damage, the client can make such a request by sending an e-mail from computer 20 via the Internet 10 to computer 15. When computer 15 receives such an e-mail from the client, the e-mail can be reviewed by personnel of the security provider or can be forwarded from computer 15 to the appropriate computer 1, 3, 5, or 7 (which in this example would be computer 1 unless the security officer who submitted the incident report has "Clocked Out" from computer 1 and then "Clocked In" via a different one of computers 3, 5, or 7, such as is described below). Because a given security officer may not work at the same location from one day to the next, and may not even work at the same general client site from one day to the next, computer 15 can be programmed with computer software 33 to keep track of the location at which the security officer corresponding to the report is located at a given time (and to store such data in database 35) and then either forward the client's e-mail to the security officer at the appropriate one of computers 1, 3, 5, or 7 for a response or send an e-mail requesting appropriate information or action from the security officer. The manner in which the invention may be used to keep track of the location of the security officer is described in more detail below.

Still referring to FIG. 1, computers 1, 3, 5, and 7 are loaded with software which is necessary or helpful for the security officers at locations near such computers 1, 3, 5, and 7 to perform their duties. As noted above, we prefer to have computers 1, 3, 5, and 7 loaded with the following commercially available software programs: Internet Explorer version 5, Microsoft Office 2000 (which includes Word 2000), and Outlook Express. Thus, computers 1, 3, 5, and 7 serve as workstations for the security officers. The officers can use computers 1, 3, 5, and 7 to draft and edit daily activity reports, incident reports, and any other reports deemed appropriate, and to submit the same via the Internet 10 to computer 15. In addition, the officers can use computers 1, 3, 5, and 7 to send and receive e-mail messages via the Internet 10. At this time, we prefer to have the e-mail traffic from the officers using computers 1, 3, 5, and 7 routed to and from computer 15 instead of directly to and from client computers 20 or 22.

A conventional DAR typically includes the following information: the identity of the security officer preparing the report, the date to which the report applies, the client property to which the report applies, a log of various incidents observed by or reported to the officer, such as assaults, burglaries, thefts, injuries, lost children, vandalism, complaints, and the like, and various details regarding such incidents, such as the name, address, and telephone number of each person involved, and a description of the incident. The DARs prepared and submitted by an officer, and stored on the database 35 of computer 15, can include such conventional information. However, DARs in accordance with the present invention may also include visual images and/or video (with or without audio) can be stored in database 35 in addition to text information. For example, an office may use a conventional digital camera, such as the MVC CD 1000 from Sony to take pictures relevant to any injuries, assaults, burglaries, vandalism, storm damage, or any other event or incident. The officer can load the electronic file containing the appropriate picture into the computer 1 by conventional means (typically by connecting the camera to the computer 1 such as via the USB port of computer 1 and using commercially available software to transmit the files from the camera to the computer 1) and then transmit the file (either as an attachment to a Word document, email, or other text message, such as a DAR, or alone) to computer 15 via Internet 10. Alternatively, the officer can use other conventional cameras, such as a Polaroid "instant" camera or other cameras which use film, and the pictures when developed (onto the paper media, for example) can be scanned (using conventional scanners) to create an electronic file of the picture. Similarly, a security officer can use any one of a number of conventional digital video cameras to record video (with or without accompanying audio) of any persons, facilities, or events, and to transmit such files to the computer 1, 3, 5, or 7 which the officer is using. The officer can then use conventional means to attach an electronic file containing a video clip to a Word document, email, or other report and then transmit the same to computer 15 via Internet 10. While the foregoing description has addressed DARs, it will be appreciated that the same benefits and flexibility of the present invention are easily applied to incident reports or any messages regarding the services provided. As technology improves, hourly reports may be provided with the present invention, thus eliminating the need for a separate DAR.

The present invention allows a client to request and obtain updated information, such as an incident report or additional information relating to a previously submitted report. A client may transmit such a request from computer 20 via Internet 10 to computer 15. A supervisor using computer 15 may then review the request and forward it to the appropriate officer by transmitting an appropriate message to computer 1 via Internet 10. Of course, a supervisor also could convey the messages and client request to the officer via telephone, pager, e-mail, or other similar means. The officer, after receiving the request, can then take additional pictures or video, such as described above, and then transmit the requested information (such as text, pictures, video clips, and the like) from computer 1 to computer 15 via the Internet 10 in the same manner as described above. Alternatively, the present invention allows the client to transmit a request directly to an officer by transmitting the request from computer 20 to computer 1, via the Internet 10. Similarly, an alternative embodiment of the invention allows the officer to send the additional information requested directly to the client by transmitting such information from computer 1 to computer 20 via the Internet 10.

It will be appreciated that the present invention can be used to allow the security officers to interact directly with clients if that is so desired. For example, the invention allows a client using computer 22 to send an e-mail via the Internet 10 directly to computer 1, thus allowing the client to communicate directly with a security officer using computer 1. If desired, computers 1 and 15 can be programmed so that an e-mail from a client using computer 20 (in this example) will be automatically forwarded to computer 15 and 1, respectively, thus making sure that a user of computer 15 monitors the e-mails sent to and from a client by an officer using computer 1 (in this example).

Those of ordinary skill in the art will also appreciate that, although the foregoing discussion uses e-mail for communications, the present invention is not so limited. In the preferred embodiment of the invention, an officer can use any one of computers 1, 3, 5, or 7 to access the web site provided by computer 15 via the Internet 10. As detailed below, the computer 15 is programmed via computer software 33 to act as a web server 30, and to receive and store information transmitted over the Internet 10 from computers 1, 3, 5, 7, 20, and/or 22 in database 35. In addition, computer 15 is programmed via computer software 33 to retrieve and provide certain HTML documents from HTML database 37, as well as information from database 35, to computers 1, 3, 5, 7, 20, and/or 22. As just one example (which is also described in more detail below), the computer 15 may provide a client using computer 20 with a display of a web site which contains a hyperlink which, when clicked by the client, provides the client with a message template. The client can then provide appropriate information and click the appropriate hyperlink to send the messages to computer 15 via the Internet 10. In addition, a client may use a computer 20 to send an alphanumeric page or other signal via the Internet 10 to computer 15 and/or computers 1, 3, 5, or 7.

It is also to be noted that the foregoing discussion has referred to computers 1, 3, 5, 7, 15, 20, and 22. It will be appreciated that the present invention is not limited to only personal computers as described in the preferred embodiment. As used herein, the term "computer" shall be understood to include personal computers, like those described in the preferred embodiment, as well as any device capable of sending, receiving, and/or displaying information over the Internet, whether by telephone lines, wireless communications, or otherwise. Accordingly, many types of personal digital assistants, cellular telephones, pagers, and other devices, should be considered a "computer" in accordance with the description of the present invention.

Figure 2:
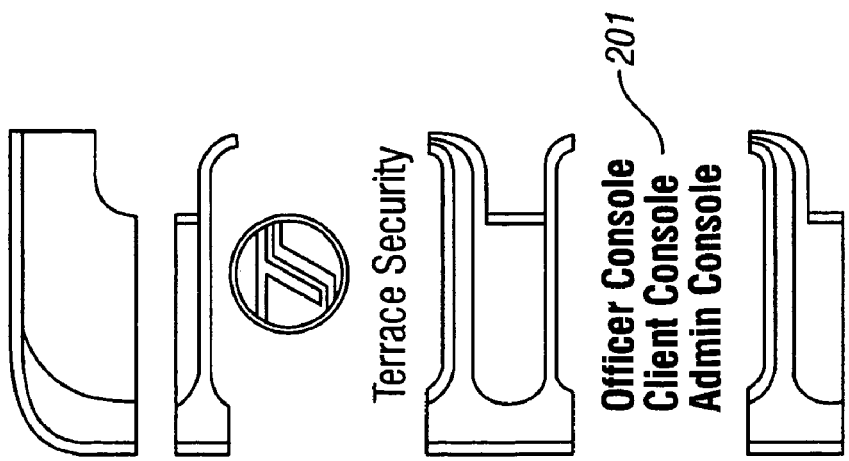
FIG. 2 is a printout of a computer screen showing the options available to a user of apparatus and methods in accordance with a preferred embodiment of the invention.

Still referring to FIG. 1, computers 1, 3, 5, and 7 can also be used to exchange information and messages between the security officers at the locations with computers 1, 3, 5, and 7 and management or supervisory personnel, who may be remotely located from the security officers. For example, the security officers, when starting a shift or arriving at a particular site from another location, may use one of the computers 1, 3, 5, or 7 to "clock in." The security officer can do this by using the computer 1, 3, 5, or 7 to access the web site maintained by (or on behalf of) the security provider company. FIG. 2 shows a printout of a computer screen display (i.e., a "page") from a web site provided by computer 15; the web site may be maintained by the security officer's employer and which may be accessed remotely by a security officer from any one of computers 1, 3, 5, and 7. FIG. 2 shows an options menu 201, which contains three hyperlinks: Officer Console, Client Console, and Admin Console. By clicking on the hyperlink "Officer Console," the security officer's computer 1 then displays the next computer screen (i.e., "page") for an officer-user of the web site of computer 15. (FIG. 2 also provides access to a "Client Console" and an "Admin Console." These web pages, their contents, and usage are discussed below.) Once the officer clicks on "Officer Console," the officer's computer 1, 3, 5, or 7 transmits the request to computer 15, which is programmed via computer software 33 to retrieve and then transmit via Internet 10 the appropriate page from the HTML database 37. The next web page displayed in this example is shown in FIG. 3.

Figure 3:
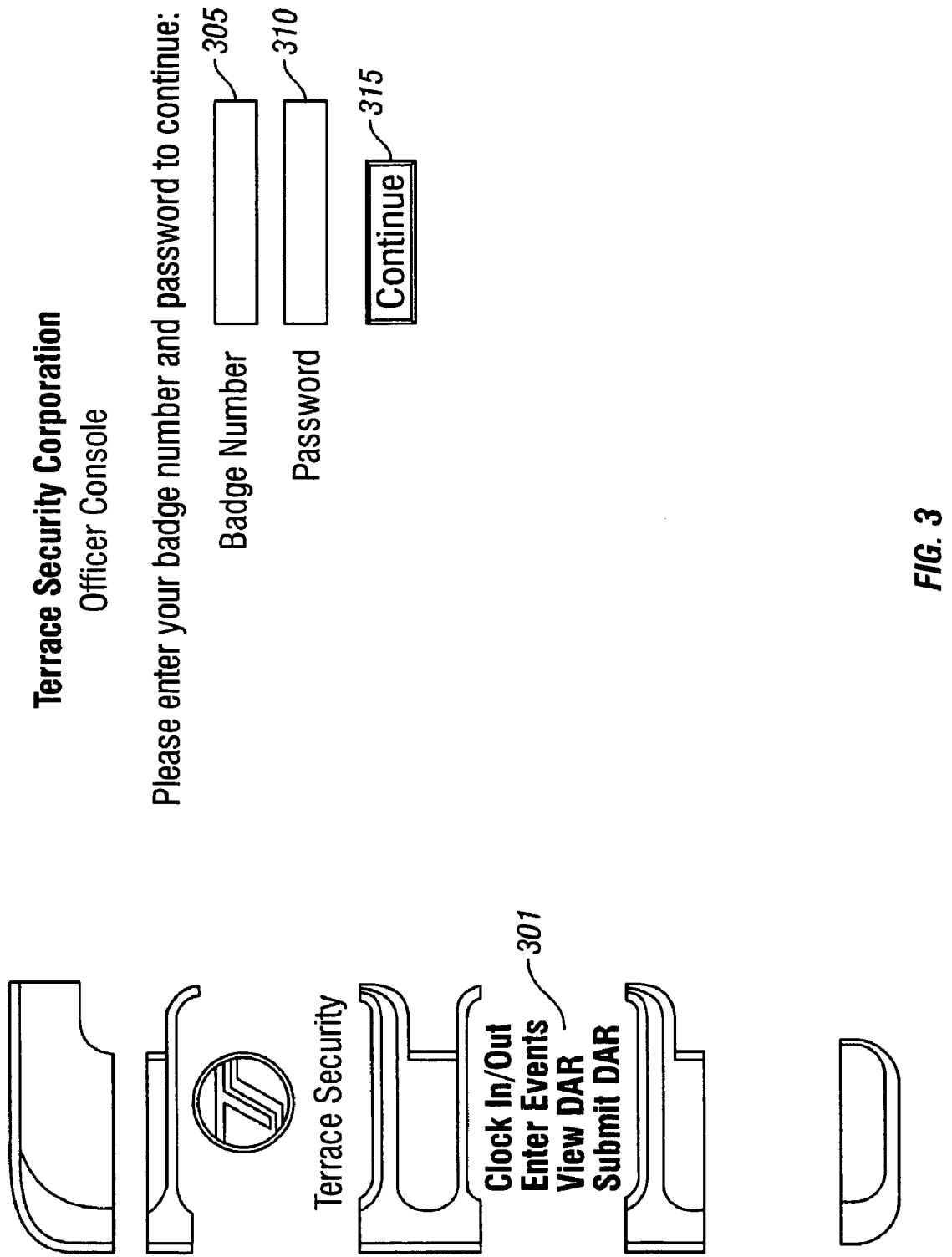
FIG. 3 is another printout of a computer screen showing the options available to a user of apparatus and methods in accordance with a preferred embodiment of the invention.

Referring now to FIG. 3, the "Officer Console" page contains an options menu 301, as well as data fields for Badge Number 305 and Password 310. As shown in FIG. 3, the web page prompts the officer to log in. The officer may do this in any one of a number of ways, such as by entering an alphanumeric identifier and a password in the data field spaces 305 and 310 provided, as is shown in FIG. 3. For administrative ease, we prefer to use the officer's surname as an identifier and a unique badge number as a password. Of course, one of ordinary skill in art will understand that many different types of security names and/or passwords may be used alone or in combination with one another. Still referring to FIG. 3, the officer logs in by entering the appropriate badge number and password into the data fields 305 and 310, respectively, on the display of computer 1, 3, 5, or 7. Once the officer has entered the appropriate badge number and password in the data fields 305 and 310, respectively, the officer can click on the Continue button 315, or simply hit the enter key, to initiate the transfer of the data via the Internet 10 to the web site of computer 15. Computer 15 is programmed with computer software 33 to check the accuracy of the badge number and password information received from the officer with corresponding information stored in the database 35. If the identifier and password information is deemed correct (e.g., matches exactly a current identifier and password for a security officer stored in database 35), then the user of computer 1, 3, 5, or 7 is allowed to proceed. Those of ordinary skill will understand that computer 15 can be programmed with computer software 33 to check various additional information in database 35 to ensure accuracy and certainty for any "match," such as cookies previously stored by the computer 15 on computers 1, 3, 5, and 7 from prior use of the web site.

Figure 4:
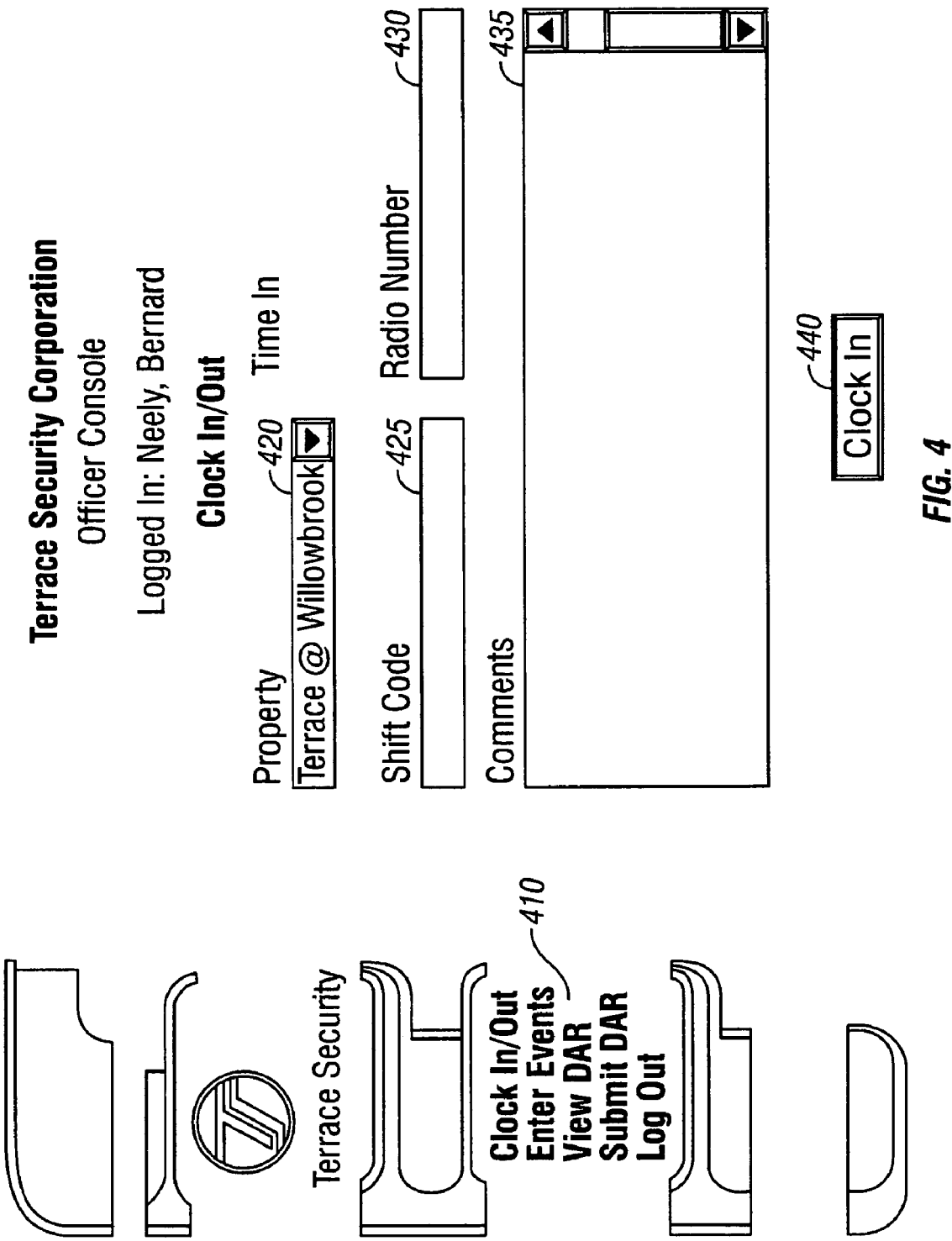
FIG. 4 is another printout of a computer screen showing the options available to a user of apparatus and methods in accordance with a preferred embodiment of the invention.

Once the officer has successfully logged in to computer 15, the officer is provided with a display of the next web page, such as is shown in FIG. 4. (The computer 15 is programmed with computer software 33 to automatically retrieve from databases 35 and 37 the appropriate information for the next web page to be sent to computer 1, 3, 5, or 7 via the Internet 10.) Referring to FIG. 4, the logged in officer is provided with a display on computer 1, 3, 5, or 7. The display shown in FIG. 4 includes an options menu 410, which has hyperlinks for the following functions: Clock In/Out, Enter Events, Via DAR, Submit DAR, and Log Out. As shown in FIG. 4, the display also contains data fields 420, 425, 430, and 435, respectively, corresponding to the client property, shift code, radio number, and comments. The display also includes a Clock Out button 440. By placing a cursor on the Clock Out button 440 and clicking, the officer can quickly clock out at the end of his or her shift. The clock out request is sent from the officer's computer 1, 3, 5, or 7 via Internet 10 to computer 15. The web page shown in FIG. 4 also contains a space 435 in which the officer may make comments.

By placing a cursor over a selected hyperlink ("Clock In/Out," "Enter Events," "View DAR," "Submit DAR," and "Log Out") from the options menu of the web page shown in FIG. 4, and clicking, the officer can select and initiate any one of several actions. For example, by clicking on the "Clock In" hyperlink displayed on computer 1, the officer using computer 1 sends a signal via the Internet 10 to computer 15. Computer 15, in response to the "clock in" signal, is programmed to record the time at which the "clock in" signal was received and store that time as the starting time for the associated officer's shift in database 35. Similarly, when the officer has completed his or her shift, the officer can access the web page as shown in FIG. 4, place the cursor over the "Clock Out" button 440 and then click. Computer 1 then sends a "clock out" signal via the Internet 10 to computer 15, which records the "clock out" time for that officer and stores the clock out time in database 35 for that officer's shift.

In a preferred embodiment of the invention, however, we prefer to have computer 15 programmed with computer software 33 so that the officer must complete and submit a daily activity report ("DAR"), and complete and submit an incident report for any incidents previously noted by that officer during that shift, before the officer is able to clock out. This approach forces the officer to submit the appropriate reports before clocking out and leaving his duty site. By taking this approach, a client is assured of receiving access (via the Internet 10) to daily reports stored on database 35 no more than about eight hours or so (i.e., the length of a shift) old. Of course, a security service provider may choose to have a supervisor review DARs (as well as incident reports, and other reports or comments) from the security officers before they are made available to a client via access to the database 35 via the access to the computer 15.

The client is able to quickly receive the officer's daily activity reports and any incident reports because computer 15 is programmed with computer software 33 to automatically update the database 35 stored on computer 15 with the daily activity reports and incident reports received from the officer. A client can then use computer 20 to access computer 15 and, by selecting information as described below, request and receive via the Internet 10 selected information from the database 35 of computer 15.

It will be appreciated that the present invention also encompasses a system in which an officer's DAR is sent directly to a client computer 20 via the Internet 10, such as by an e-mail message. Alternatively, an officer's DAR can be sent to both a client computer 20 and computer 15 at the same time.

Figure 4A:
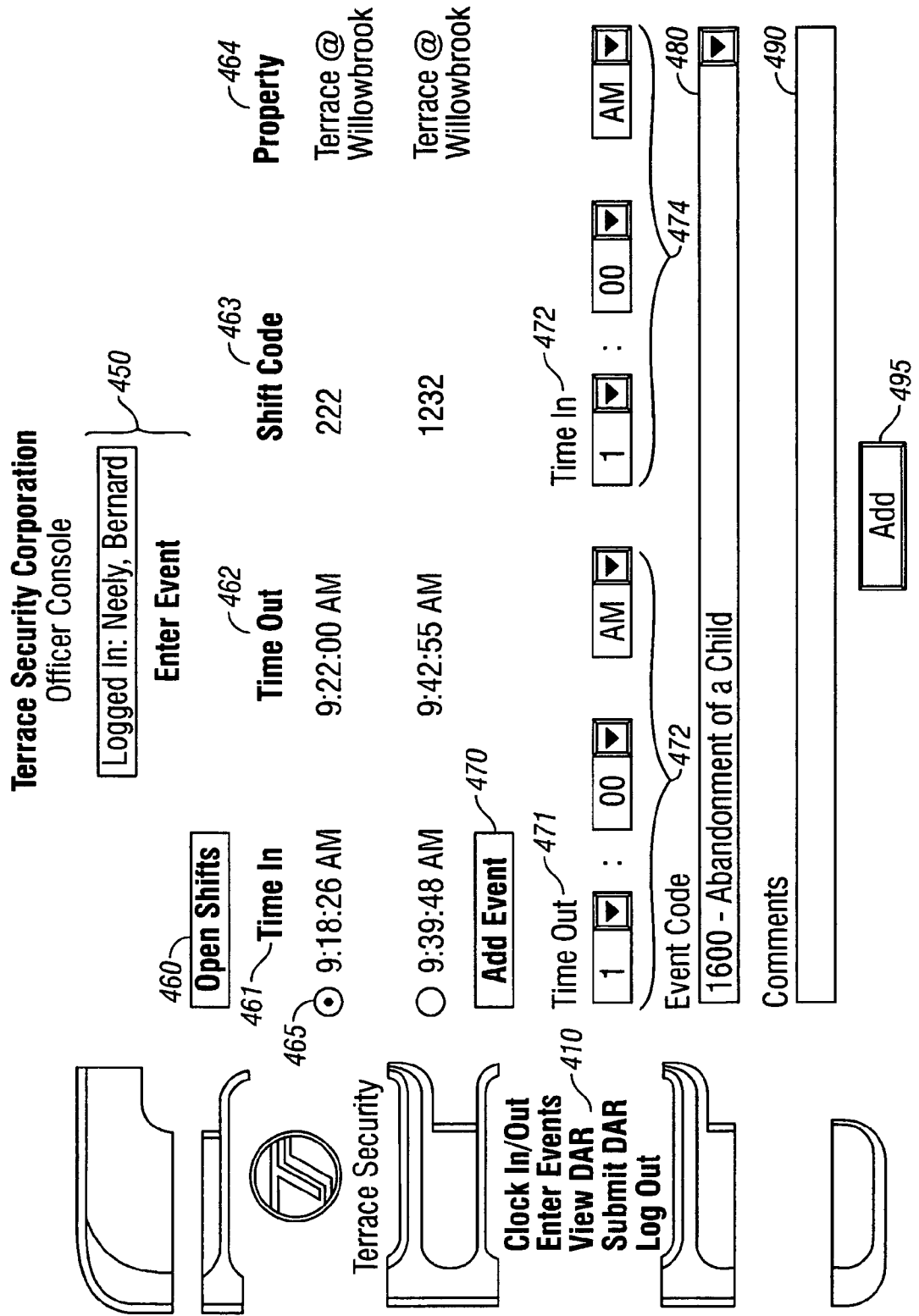
FIG. 4A is another print of a computer screen showing the options available to a user of apparatus and methods in accordance with the present invention.

Referring now to FIG. 4A, a printout of a computer screen presented to a security officer is shown. FIG. 4A shows the "Enter Event" screen presented to an officer when the officer clicks on the "Enter Events" selection in the menu 410, as is shown in FIGS. 4 and 4A. The "Enter Event" screen in FIG. 4A shows a number of data fields, including under the "Open Shifts" heading 460 the "Time In" 461, the "Time Out" 462, the "Shift Code" 463, and the "Property" 464. As shown by the indicator 465, the system has the initial data group selected. In addition, the screen shown in FIG. 4A also presents data fields under the "Add Event" heading 470. These data fields include drop-down menus 473 and 474 for the "Time Out" 471 time and the "Time In" 472 times, respectively. In addition, a data field 480 for entry of an event code is provided with a drop-down menu. A data field 490 for entry of additional comments by the officer is also provided. Once the officer has entered the desired information in the appropriate data fields, the officer clicks on the "Add" button 495 to send the data to the web site of computer 15, where the added data is added to database 35.

Figure 5A:
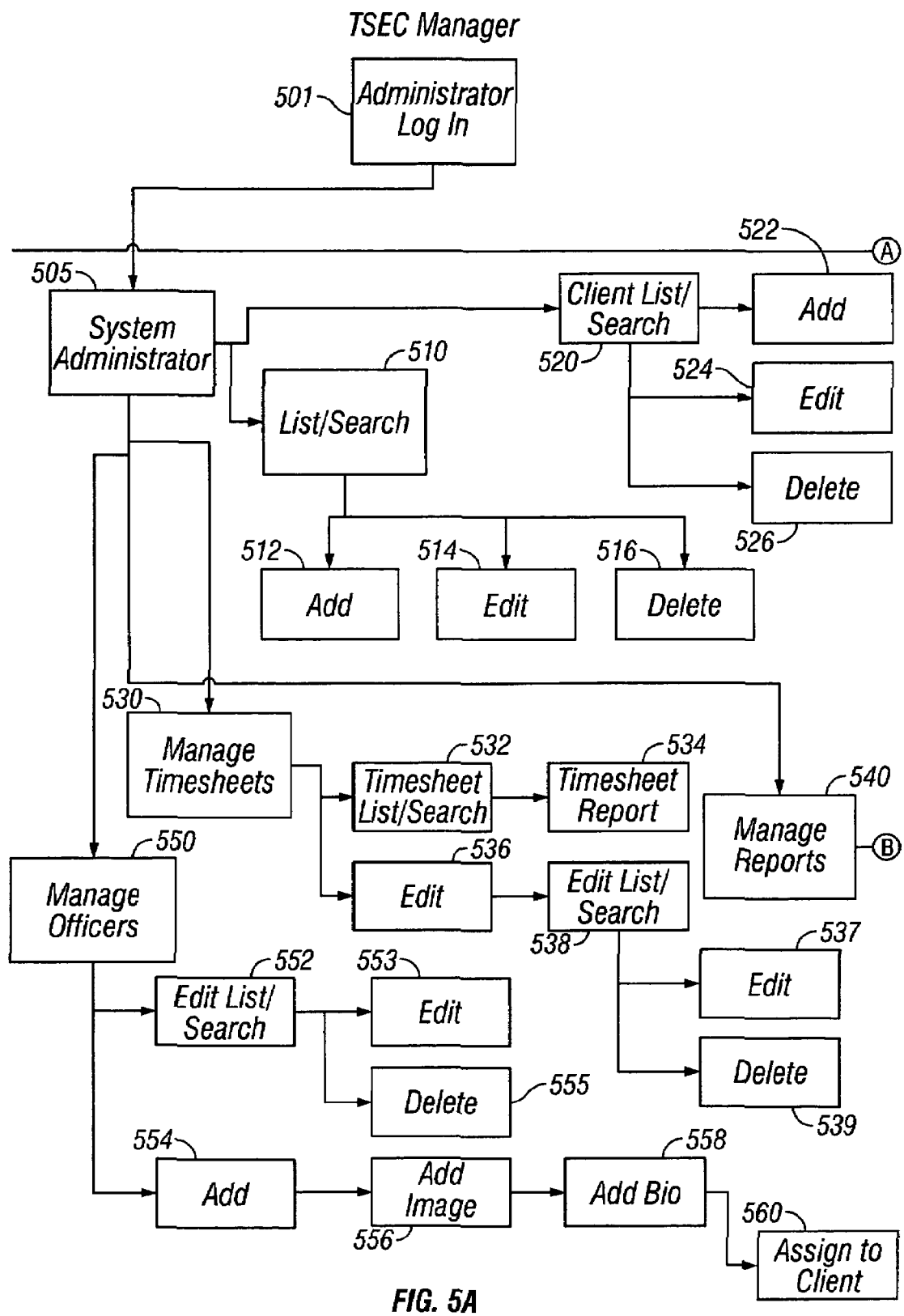
FIGS. 5A-5C illustrate a flow diagram showing the various functions which can be performed by users of apparatus and methods in accordance with a preferred embodiment of the invention.
Figure 5B:
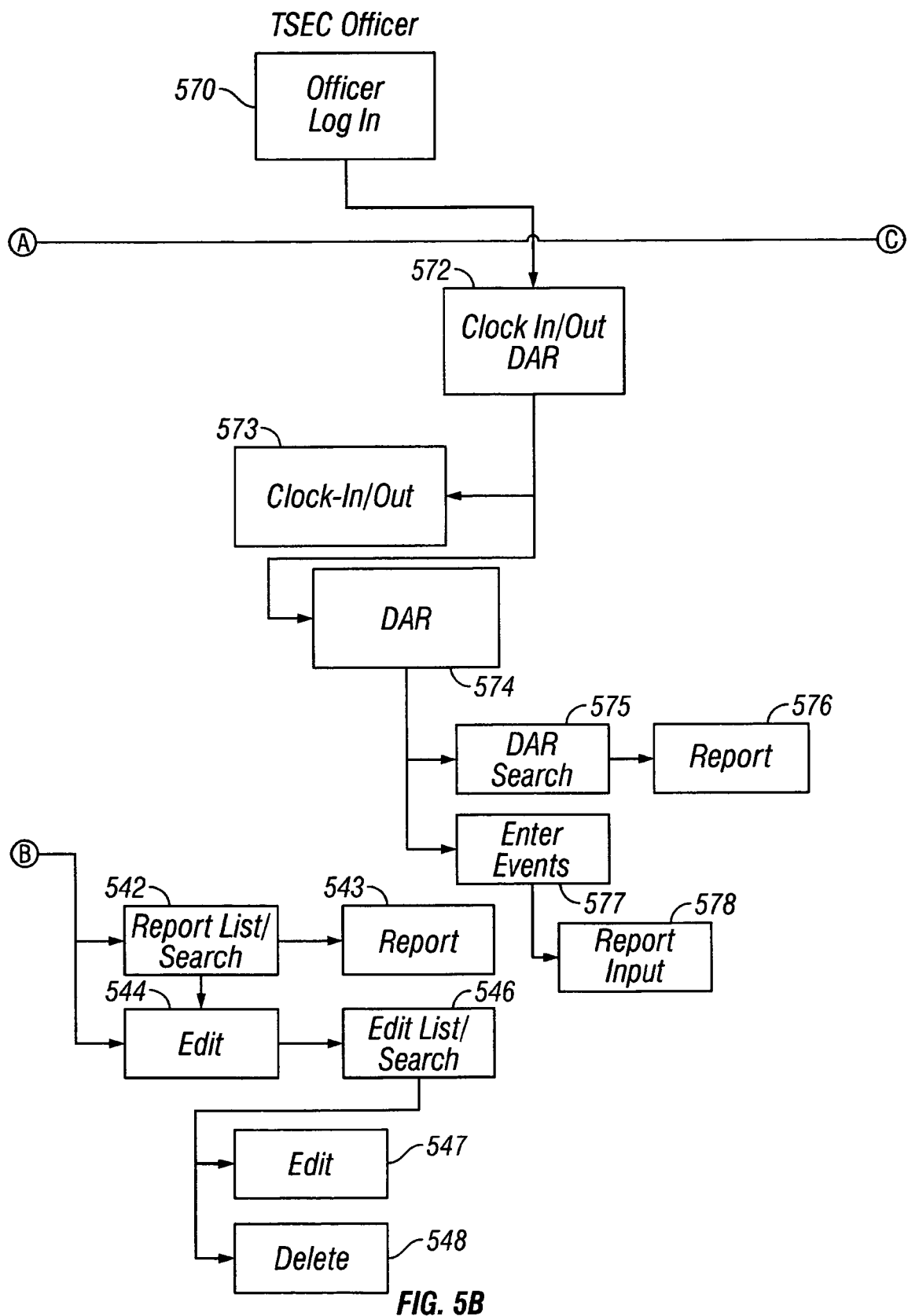
Figure 5C:
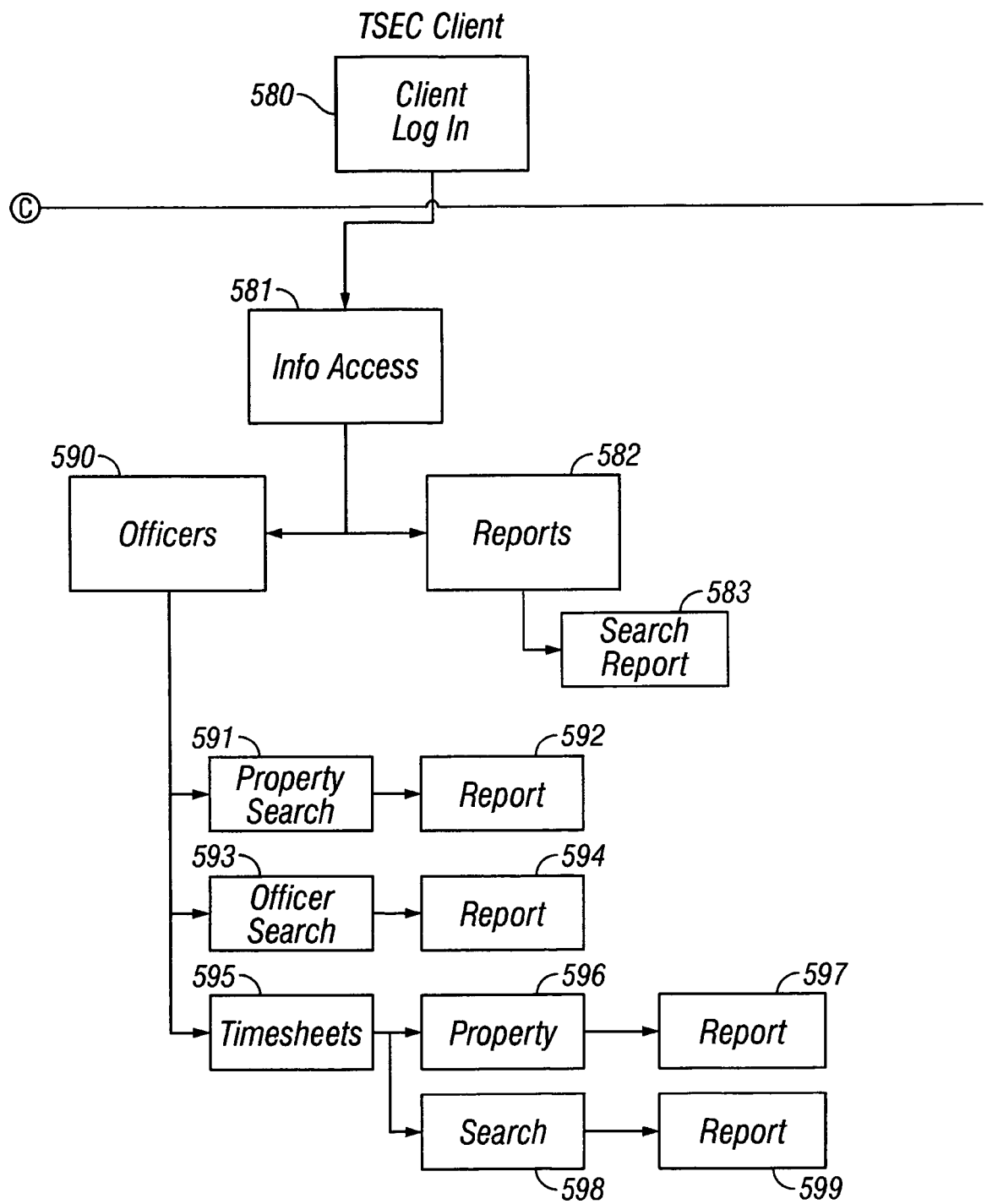

Referring now to FIGS. 5A-5C, a flow diagram showing the various features and functions of the Web site of computer 15 as programmed with computer software 33 in accordance with the preferred embodiment is shown. Once a user accesses the Web site, the user is provided with a page like that shown in FIG. 2. FIGS. 5A-5C show the various features and functions available to administrators, officers, and clients, respectively. It will be appreciated that differing levels of access can be provided, such as allowing certain security officers who also have supervisory or management duties to have the ability to perform functions otherwise provided only to an administrator in the preferred embodiment of the invention. In our preferred embodiment, we have three levels of access for administrators, officers, and clients, respectively.

Still referring to FIGS. 5A-5C, the various features and functions are shown and are discussed below. Referring first to an administrator login function 501, the following functions are available to a system administrator after the administrator login function 501. After the administrator logs in by transmitting an appropriate identifier and password to computer 15, the computer 15 is programmed to search the database 35 for an identifier and password pair which match those received and, assuming a match is made, the computer 15 then logs in the user as a system administrator, as shown at function 505. Once a system administrator has logged in, the following functions are available. First, the administrator may administer the list of properties for which security services are to be provided, as is shown at function 510. The properties list/search function 510 allows the administrator to find a property by searching the database 35 on computer 15, or to add a new property, such as by using the add function 512. Alternatively, the system administrator can use the edit function 514 to modify the properties, such as by correcting the name or address of a property, or the like. In addition, the administrator can use the delete function 516 to delete a property from the list of properties for which security services are provided. The administrator is thus able to maintain and update the database 35.

Still referring to FIGS. 5A-5C, the administrator can use the client list/search function 520 to administer the client entries in the database 35 of computer 15. For example, the administrator can enter a client name, then use the search function to find the various entries in the database 35 corresponding to the client entered as a search string. In addition, the administrator can use the add function 522 to add additional clients to the database 35 of computer 15, use the edit function 524 to edit or modify the names, spellings, addresses, and the like for any particular client, and can use the delete function 526 to delete a client from the list of clients included in the database 35 of computer 15.

Still referring to FIGS. 5A-5C, it can be seen that the system administrator has the ability to manage the data contained in the database 35 of computer 15. For example, the manage officers function 550 allows the system administrator to use the add function 554 to add additional officers to the database 35 of computer 15. In addition, the system administrator can use the add image function 556 to add a picture of the new officer (added by the add function 554) to the database 35 of computer 15. The system administrator can also use the add bio function 558 to add a short biographical summary for the officer. The system administrator can also use the assign to client function 560 to assign a particular officer to a particular client (or, alternatively, can be used to assign an officer to a particular client location or the like). The system administrator can also use the edit list search function 552 to find the entries for a particular officer (such as by searching by the surname or batch number of an officer) and can then use edit 553 and delete 555 functions in order to either edit or delete the officer information from the database 35 in computer 15, as appropriate.

The system administrator can also use the manage timesheets function 530 to manage the time entry information for the various officers. For example, the administrator can use the timesheet list/search function 532 in order to find the desired timesheet report of a particular officer. The administrator can use this information to prepare a timesheet report, such as by using the timesheet report function 534, or can use the edit function 536. The administrator can use the edit function 536 function to edit locations, such as by modifying existing locations, adding new locations, or deleting existing locations, as may be desired, in the database 35.

The system administrator can also use the manage reports function 540 to manage the various reports prepared and submitted by the officers. The administrator can use the report list/search function 542 to find a desired report function 543. Alternatively, the administrator can use the edit function 544 and edit list/search function 546 to find the desired report and, once found, can then use the edit function 547 to either edit the report or use the delete function 548 to delete the report, as the administrator deems appropriate.

Still referring to FIGS. 5A-5C, the manner in which an officer may use the database 35 of computer 15 is shown and described below. The officer login function 570 has been described above in connection with the officer's login and clock-in procedures. The clock-in/out DAR function 572 allows the officer to clock-in at the beginning of a shift and, at the end of a shift, clock-out as described above. The officer does this using the clock-in/out function 573. In additional, the present invention provides a DAR function 574 to allow the officer to prepare a daily activity report. Once a daily activity report has been prepared, the officer can submit the same to computer 15 using the DAR function 574. In addition, the present invention provides that the submitted DAR search function 575. The submitted DAR search function 575 allows an officer to enter a search string and have the software 33 perform a search of the database 35 of computer 15 for an existing DAR. The officer may wish to do this in order to edit a prior report or to supplement a prior report. Once the desired DAR is found by the officer using the submitted DAR search function 575, the officer can transmit a request for, and obtain on computer 1, a copy of the desired DAR and can then view the report by using the report function 576. In addition, the officer can use the enter function 577 to provide and transmit additional information to the database 35 of computer 15. Once the officer initiates the enter events function 577, the browser software of computer 1 displays a template which requests additional information from the officer. The officer can then use the referenced report input function 578 to input the appropriate information. Once the officer has completed the entry of the information, the officer can enter the data and transmit the same from computer 1 via the Internet 10 to computer 15.

Still referring to FIGS. 5A-5C, the client user's ability to access information from the database 35 of computer 15 is shown and is described below. As detailed above, a client user can use the client login function 580 in order to log into the Web site of computer 15 via Internet 10. Once the computer 15 has verified the identifier and password information received from the client user (e.g., transmitted from computer 20 via the Internet to computer 15), the client is passed to the info, access function 581. At this point, the client user can choose to access information from database 35, such as reports using the reports function 582, or can access information regarding the security officers providing services to that client by accessing the officers function 590. If the client wishes to obtain information from the reports and uses the reports function 582, the client user is allowed to search the database 35 of computer 15 by the using the search report function 583. Once the user finds and selects the report the user wishes to view (such as by clicking on the hyperlink for that report), the report is transmitted from computer 15 via the Internet 10 and is displayed by the browser software of computer 20. Alternatively, if the client wishes to obtain information regarding the officers, the client can use the officers function 590 to do so. Once the client initiates the officers function 590, the user is allowed to search the database 35 in various ways for the desired information by property search function 591, the officer search function 593, or the time sheets function 595. As with the other search functions provided by the computer 15, once the client selects the desired entry from the entries in database 35 returned by the selected search function, the client can click on the desired entry displayed as a hyperlink on computer 20 by its browser and then see the report via report function 592, the report function 594 or the like. With respect to timesheets, the present invention allows the user to select the timesheets function 595, which then allows the client user to search by property or by officer, by allowing the client user to select the property function 596 search or the officer search function 598. As with the other search functions provided by computer 15, the client user receives one or more entries in response to the search (which are displayed on computer 20 by its browser) and the client user is then able to select the desired entry for further viewing, which is provided by report function 597 and the report function 599.

Figure 6:
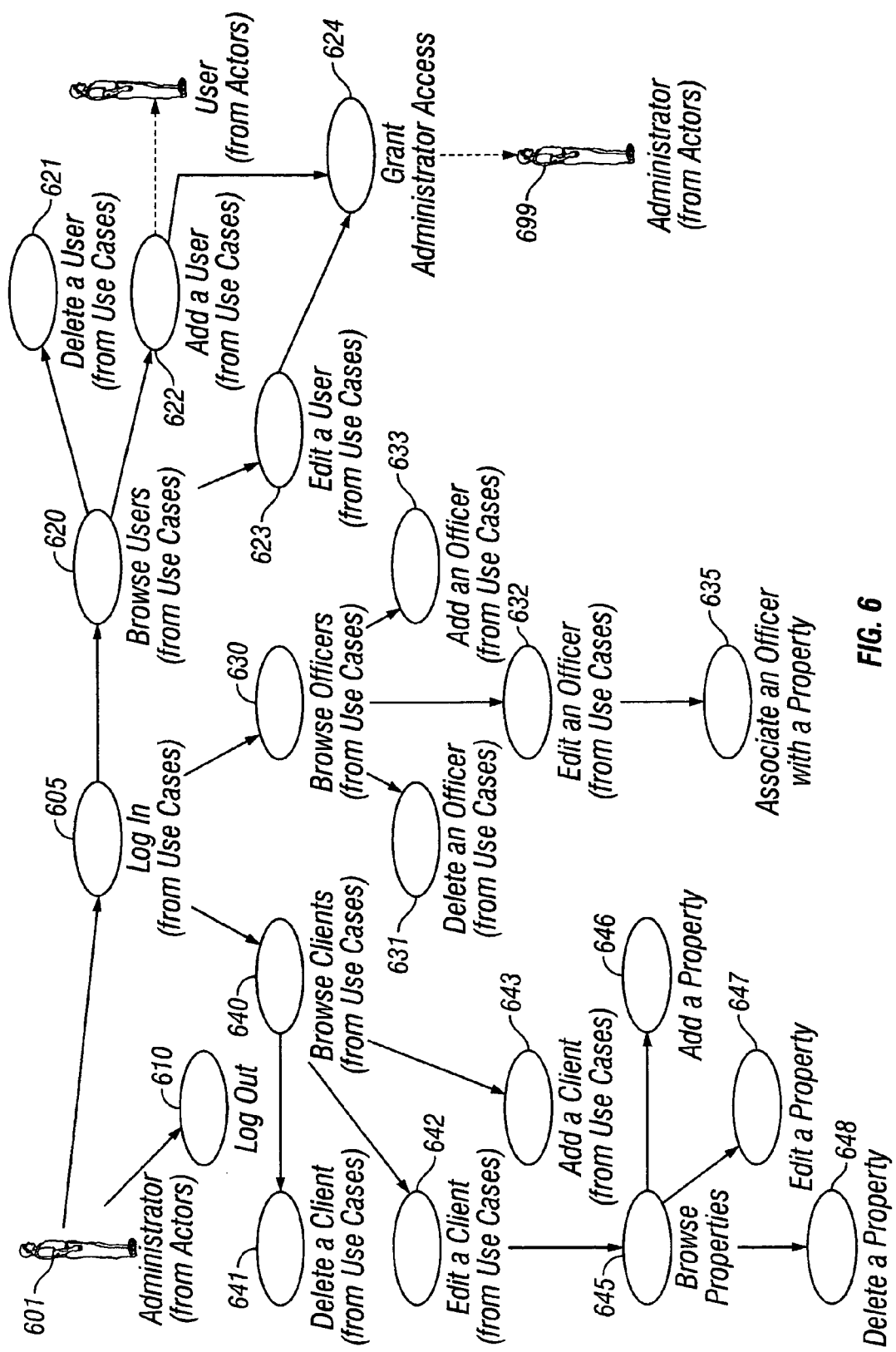
FIG. 6 is a flow diagram showing the various steps or functions that can be performed by an administrator in accordance with a preferred embodiment of the present invention.

Referring now to FIG. 6, a flow diagram of the functions and steps available to a system administrator 601 in accordance with a preferred embodiment of the present invention is shown. In FIG. 6, the administrator 601 has a number of functions available in connection with the potential use of the web site. Once the administrator 601 has performed the Log In step 605, the administrator can select from the following functions: Browse Users 620, Browse Officers 630, and Browse Clients 640. If an administrator 601 is already logged into the web site, the administrator 601 can also Log Out function 610. If the administrator 601 decides to use the Browse Users function 620, the administrator 601 can click on the hyperlink on a computer screen corresponding to that function and will then be given a menu which allows the administrator 601 to select from the following functions: Delete a User 621, Add a User 622, or Edit a User 623. If the administrator 601 decides to either add a user 622 or edit a user 623, the result is to use the Grant Administrator Access function 624 to create a new administrator 699. If the administrator 601 chooses the Browse Officers function 630 by clicking on the appropriate icon or hyperlink, then the administrator 601 will be presented with an on-screen menu offering the option of selecting one of the following functions: Delete an Officer 631, Edit an Officer 632, and Add an Officer 633. If the administrator 601 chooses the Edit an Officer function 632, then the result is to associate an officer with a particular property 635. The administrator 601 can also select the Browse Clients function 640. If the administrator 601 selects this function, then the administrator 601 will be presented with a screen which offers a menu listing the following functions as available: Delete a Client 641, Edit a Client 642, and Add a Client 643. If the administrator 601 selects the Edit a Client function 642, then the administrator 601 will have the further option to browse the properties 645. At this point, the administrator 601 can also select from the following functions: Add a Property 646, Edit a Property 647, and Delete a Property 648.

Figure 9:
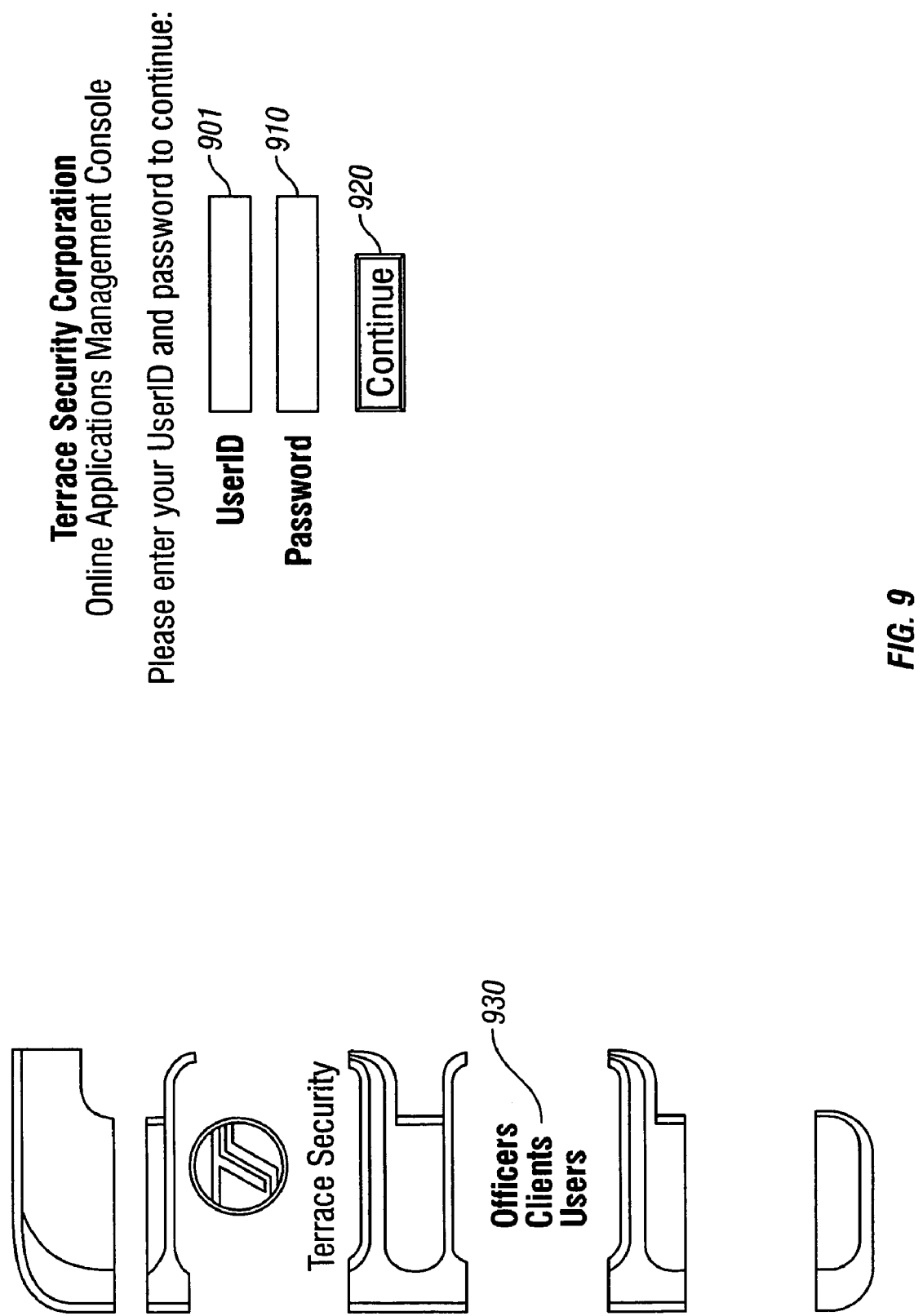
FIG. 9 is a printout of a screen from a web site in accordance with a preferred embodiment of the present invention.

Referring now to FIG. 9 and FIGS. 12-14, examples of the computer screens which are provided by the web site of computer 15 to an administrator 601 exercising various options in accordance with a preferred embodiment of the present invention are shown. In FIG. 9, a printout of a screen is shown which prompts a user, such as administrator 601, to enter a user ID and password in the appropriate user ID field 901 and a password field 910. Once the user ID and password have been entered in the appropriate fields 901 and 910, respectively, the administrator 601 can then select the Continue button 920 and click on it, or can simply hit the enter key on the computer used by the administrator 601 to access the web site. As noted above, once the administrator 601 enters the user ID and password and then hits the enter key or the continue button 920, the user ID and password are transmitted to the computer 15, where they are checked by the computer program 33 on the computer 15 (such as by comparing them to the user ID and password combinations stored in database 35) to ensure that the user ID and password correspond to an authorized administrator 601. Assuming that the user ID and password supplied are correct, the computer 15 is programmed to then allow the administrator 601 to select from the options menu 930 a hyperlink corresponding to an option for officers, clients, or users.

Referring now to FIG. 12, an example of a screen printout in accordance with a preferred embodiment of the present invention is shown for the officer administration functions for the use of the administrator 601 after the administrator 601 has logged into the web site of computer 15. In FIG. 12, an options menu 1250 is provided. The printout of the screen shown in FIG. 12 assumes that the administrator 601 has clicked on the hyperlink for the Officers option in the menu 1250. The data field 1210 shows a list of security officers, including last and first names, corresponding badge numbers, and corresponding biographical information as appropriate. The officer administration screen shown in FIG. 12 also includes the following buttons (or icons): Edit Selected Officer 1220, Delete Selected Officer 1230, and Add New Officer 1240. By selecting and clicking on any one of buttons 1220, 1230, or 1240, the administrator 601 is then provided by computer 15 with the next screen, by which the administrator 601 can performed the desired function. In the data field 1210 of FIG. 12, a dot in the circle corresponding to officer Calamari is shown. This dot indicates that officer Calamari has been selected for whatever function the administrator 601 selects by depressing any one of the buttons 1220, 1230, 1240. Once the administrator 601 has performed the desired officer administration functions, the administrator 601 can click on the hyperlink for the "Log Out" option in the menu 1250, or can click on either of the hyperlinks for the "Clients" or "Users" option in menu 1250 in order to administer data associated with clients or users, respectively.

Figure 13:
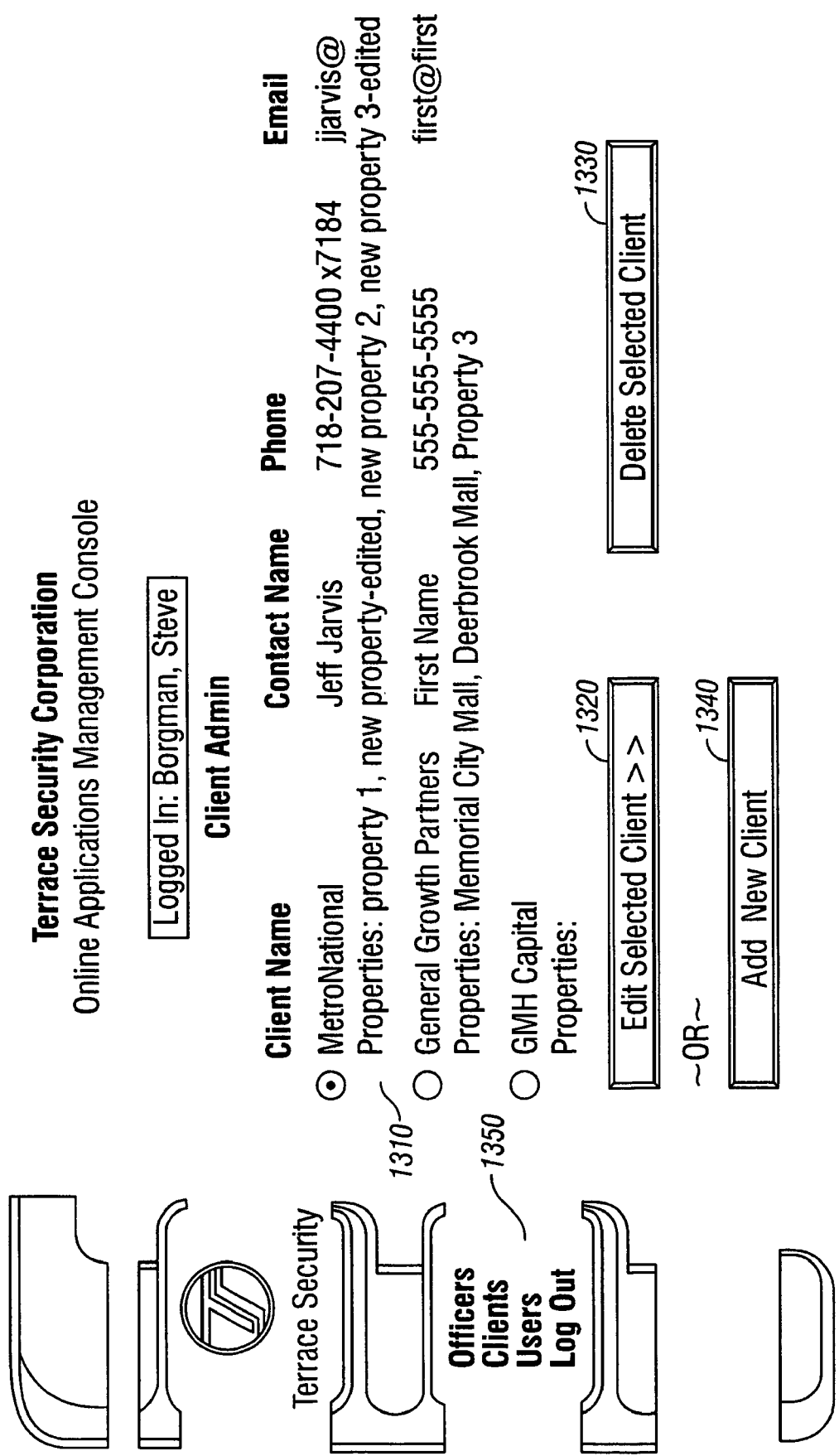
FIG. 13 is a printout of a computer screen from a web site in accordance with a preferred embodiment of the present invention.

Referring now to FIG. 13, a printout of an example of a computer screen presented to an administrator 601 for use in connection with the client administration functions in accordance with a preferred embodiment of the invention is shown. Referring to FIG. 13, a client administration data field 1310 is shown. In data field 1310, the client name, corresponding client contact name, client contact phone number and e-mail address are provided. In addition, FIG. 13 shows the icons or buttons by which an administrator 601 can select various client administration functions, including the following: Edit Selected Client button 1320, Delete Selected Client button 1320, and Add New Client button 1340. By selecting one of buttons 1320, 1330, or 1340, the administrator 601 can select the function to be performed on the client data for the client selected, as is indicated by the dot shown in the circle corresponding to the client name in the data field 1310. Once an administrator 601 has completed the desired functions available as shown on the client administration screen in FIG. 13, the administrator 601 can click on the hyperlink for the log out function shown in the menu 1350, or can click on the hyperlinks in the options menu 1350 for "Officers" or "Users" to administer data associated with officers or users, respectively.

Referring now to FIG. 14, a printout of the user administration screen available to an administrator 601 in accordance with the present invention is shown. In FIG. 14, a data field 1410 shows information regarding authorized users. The data field in 1410 includes the last name, first name, user ID, and an indicator of whether such person has been provided the authority and rights of an administrator of the system. As shown by the dot in the circle in FIG. 14, Steve Borgman is the selected user as shown in data field 1410. Administrator 601 can use one of the icons or buttons 1420, 1430, or 1440 to exercise any one of the following functions: Edit Selected User, Delete Selected User, or Add New User, respectively, corresponding to buttons 1420, 1430, and 1440. Like the screen printouts shown in FIGS. 12 and 13, the user administration screen shown in FIG. 14 also has an options menu 1450, by which an administrator 601 can select other functions once the administrator 601 has completed the desired user administration functions.

Figure 7:
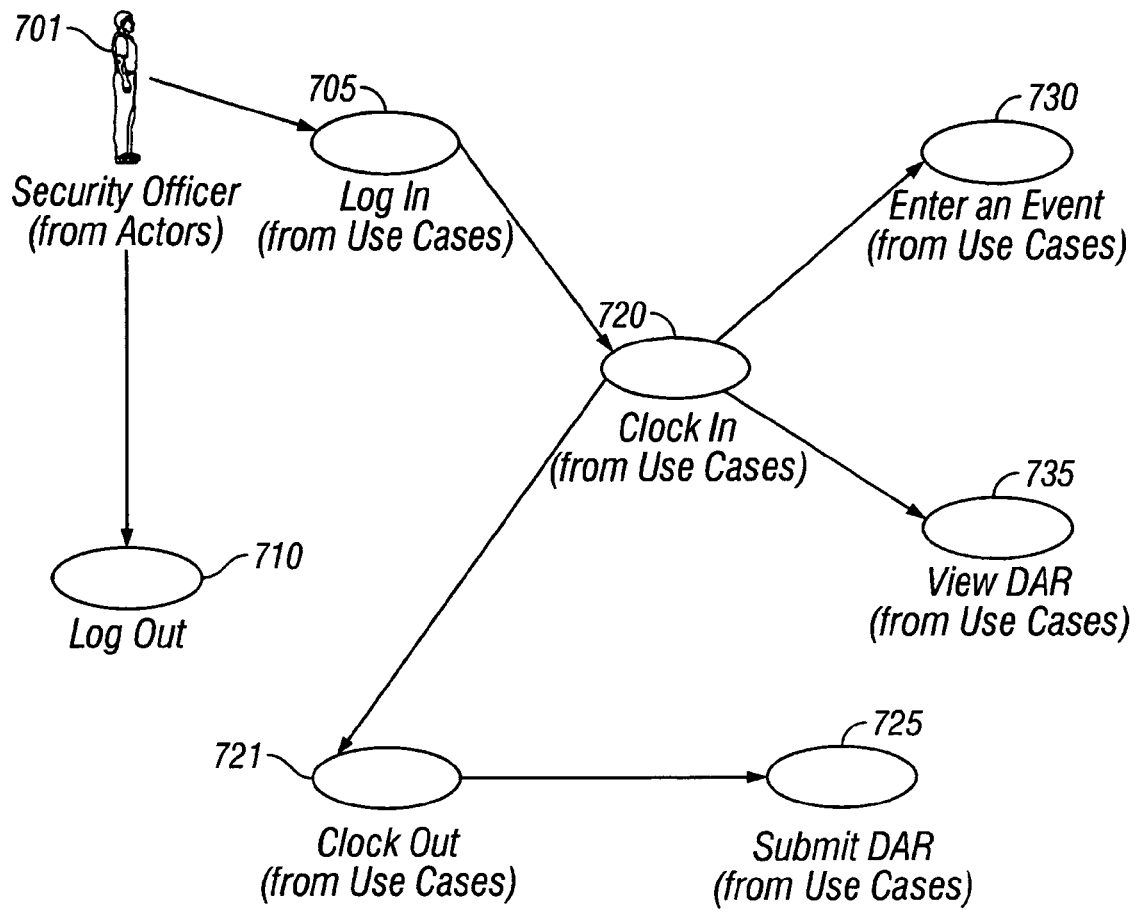
FIG. 7 is a flow diagram showing the various steps or functions that can be performed by a security officer in accordance with a preferred embodiment of the present invention.

Referring now to FIG. 7, a flow diagram is shown which describes the functions available to a security officer 701 in accordance with the present invention. As shown in FIG. 7, an officer 701 can use the system to log in 705 or, if logged in, to log out 710. (As noted above, FIG. 3 is an example screen presented to an officer 701 for the Log In function 705.) Once an officer 701 has logged in through the Log In function 705, the officer 701 is prompted to clock in at the clock-in function 720. (Referring to FIG. 3, the options menu includes a hyperlink for the option for "Clock In/Out," which the officer 701 can select in order to perform the Clock In function 720 or, if already clocked in, to perform the Clock Out function 710.) Once the officer 701 has clocked in at function 720, the officer 701 then can select from several options, such as those shown by the hyperlinks in the options menu 410 shown in FIG. 4. Referring to FIG. 4 and FIG. 7 together, the officer 701 can select any one of the following functions by clicking on the appropriate line or entry in options menu 410: Enter an Event 730, View DAR (daily activity report) 735, Submit DAR 725, or Clock Out 721. As shown in FIG. 7, if the officer 701 has performed the clock-out function 721, but has not yet submitted a DAR, the system will prompt officer 701 to finalize and submit a DAR. The system will require the officer to perform the submit DAR function 725 before the officer 701 is allowed to clock out 721.

Figure 8:
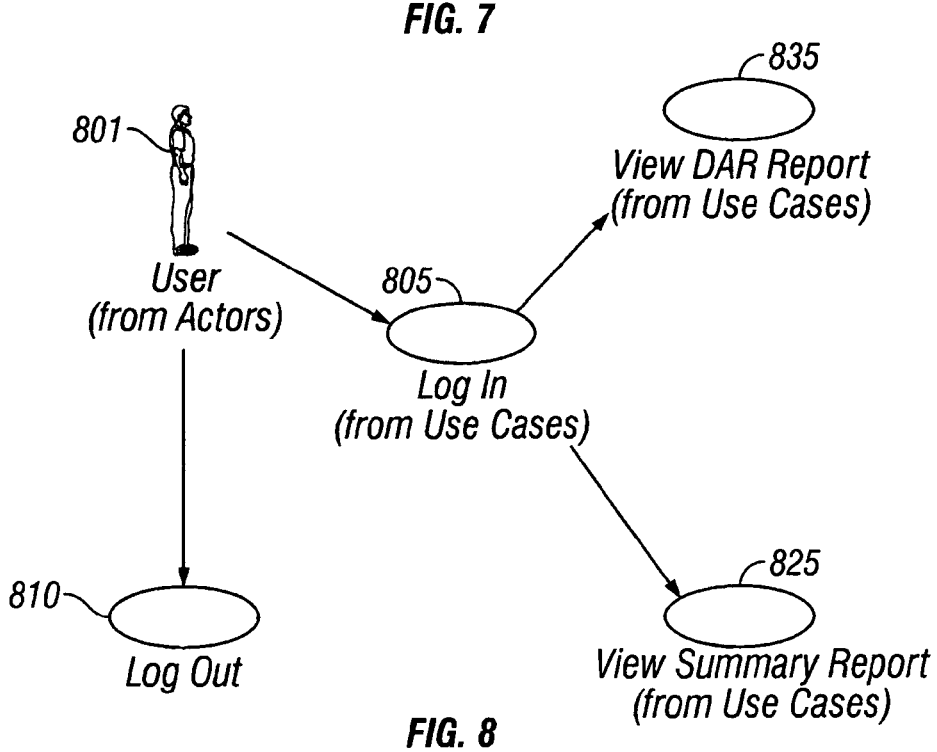
FIG. 8 is a flow diagram showing the various steps or functions that can be performed by a client in accordance with a preferred embodiment of the present invention.

Referring now to FIG. 8, the options available to a client user 801 of a system in accordance with a preferred embodiment of the present invention is shown. As shown in FIG. 8, a user 801 wishing to access the web site of computer 15 must first perform the log-in function 805. If the user 801 is already logged in, then the user 801 has the option of the log-out function 810. Once the client user 801 has performed the log-in function 805, the user 801 can also select the view DAR report function 835 or the view Summary report function 825.

Figure 10:
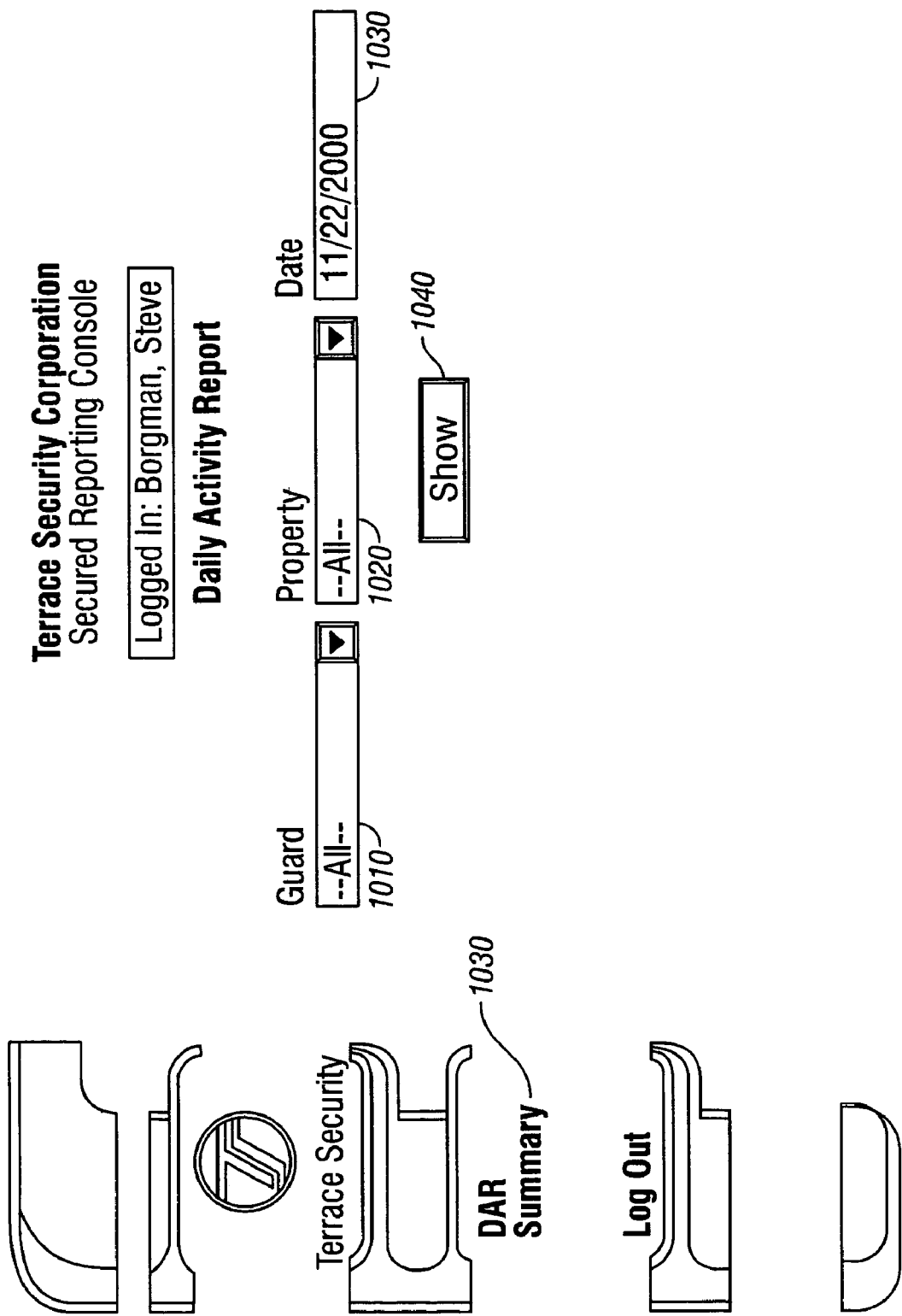
FIG. 10 is a printout of a screen from a web site in accordance with a preferred embodiment of the present invention.
Figure 11D:
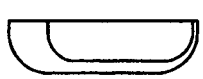

Referring now to FIG. 10, a printout of an example of the daily activity report screen available to a user 801 who selects the view DAR report function 835 (as shown in FIG. 8) is provided. Referring to FIG. 10, daily activity report search fields 1010, 1020, and 1030 are shown. The daily activity report search fields 1010, 1020, and 1030 correspond to searches of the database 35 of the web site to be performed based on Guard, Property, and/or Date information, respectively. As indicated by the arrows shown in the Guard search field 1010 and the Property search field 1020, a user 801 can click on the respective arrows (or other portions, if so desired) of search fields 1010 and 1020 and obtain drop-down menus which provide, in the case of the Guard search field 1010, the last name of the guards applicable to user 801. In a case of the Property search field 1020, the user 801 can click on the arrow and obtain a drop-down menu listing the properties applicable to user 801. In addition, the user can type in the date desired for use as the search criteria in date field 1030. The user 801 can then highlight the selected officer and/or property listings in search fields 1010 and 1020 for the desired search criteria. Once user 801 has entered the desired information in the search fields 1010, 1020, and 1030, the user 801 can click on the Show button 1040 or can simply hit the enter key. Once the user 801 has clicked on the Show button 1040 or hits the enter key, the client computer 20 or 22 transmits the search request via the Internet 10 to computer 15. Computer 15 is programmed to search the database 35 of the web site applicable to user 801 with the search criteria supplied by the user as indicated above and then transmit the results to user 801 by sending the information via the Internet 10 to client computer 20 or 22.

Referring now to FIGS. 11A-11D, the results of a general search of the database 35 by user 801 are shown. As shown in FIGS. 11A-11D, the daily activity reports are shown for thirteen different shifts by security officer Calamari. These daily activity reports reflect the posts at which officer Calamari served for the times and dates indicated for the thirteen different shifts shown in FIGS. 11A-11D. Those of ordinary skill in the art will appreciate that the information provided by computer 15 to the client user 801 can include hyperlinks to DARs, incident reports, and other information, such as pictures or video clips, stored on database 35. Those of ordinary skill in the art will also appreciate that the information provided by computer 15 to the client computer 20 can include hyperlinks to additional information, such as by including hyperlinks to incident reports, pictures, and/or video clips, within a DAR.

Referring now to FIGS. 15A-15E, an example of the computer screen presented to officer 701 after the officer selects the Enter Events function from the options menu in the Officer Console. As shown in FIGS. 15A-15E, the officer 701 is provided with a computer screen which contains numerous data fields for the officer 701 to complete in connection with an Incident Report, including information as to the officer 701, the property, the governmental units involved (e.g., police departments, fire departments, etc.) if any, the individual(s) involved, the date, time, and location of the incident, and so on. The screen provided, as shown in FIGS. 15A-15E is essentially a blank form for use by the officer 701 in preparing and submitting an Incident Report.

Figure 16A:
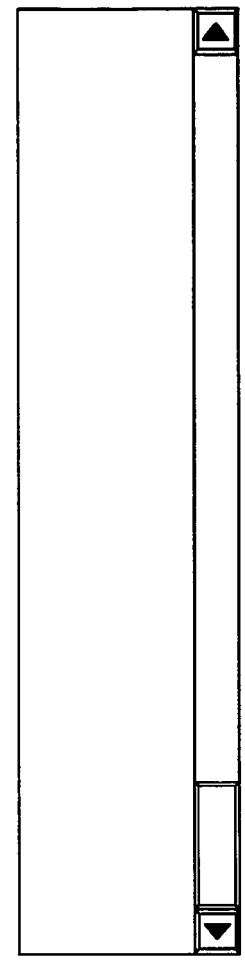
FIGS. 16A-16N are printouts of a computer screen of the web site in accordance with a preferred embodiment of the present invention.
Figure 16K:
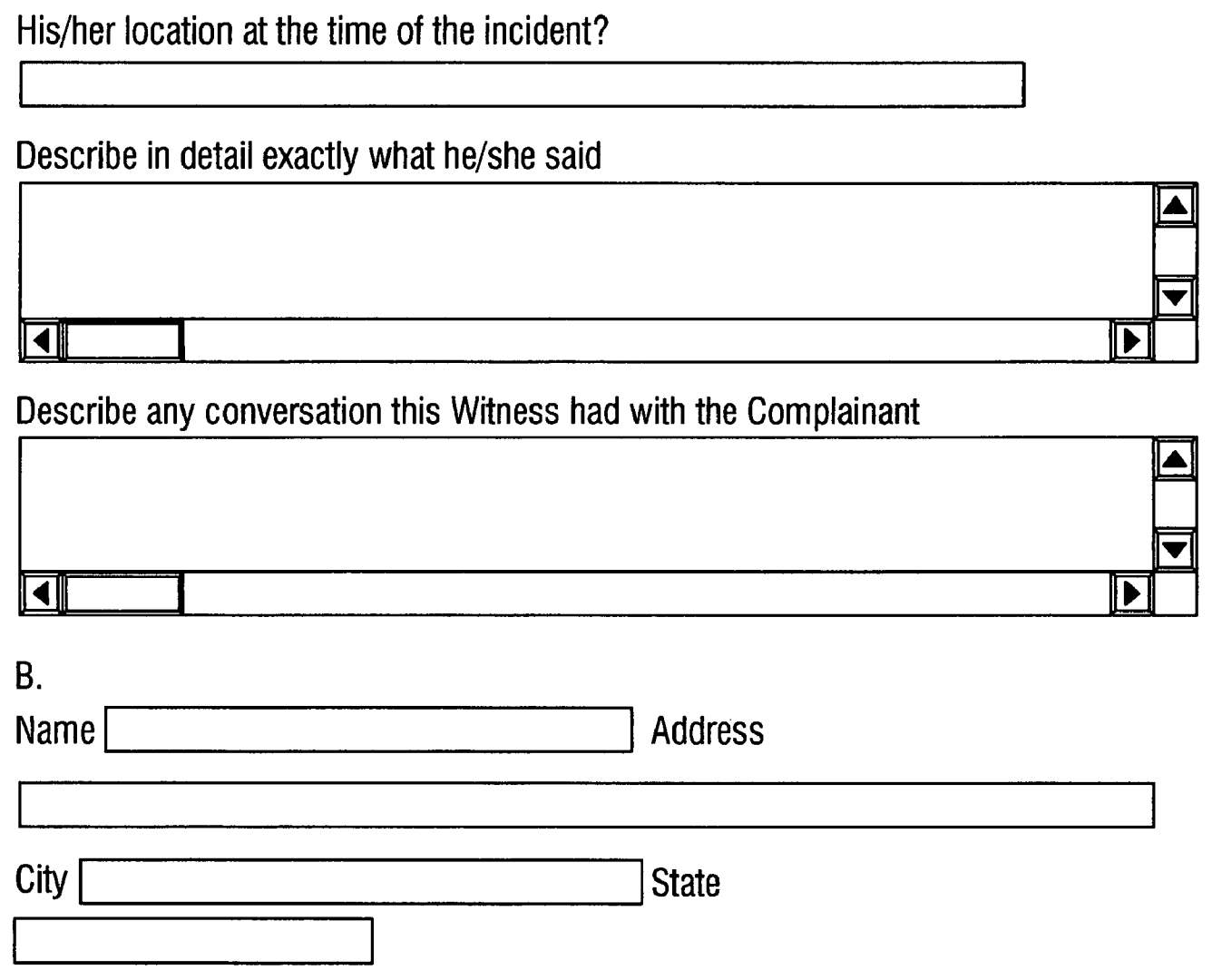
Figure 16L:
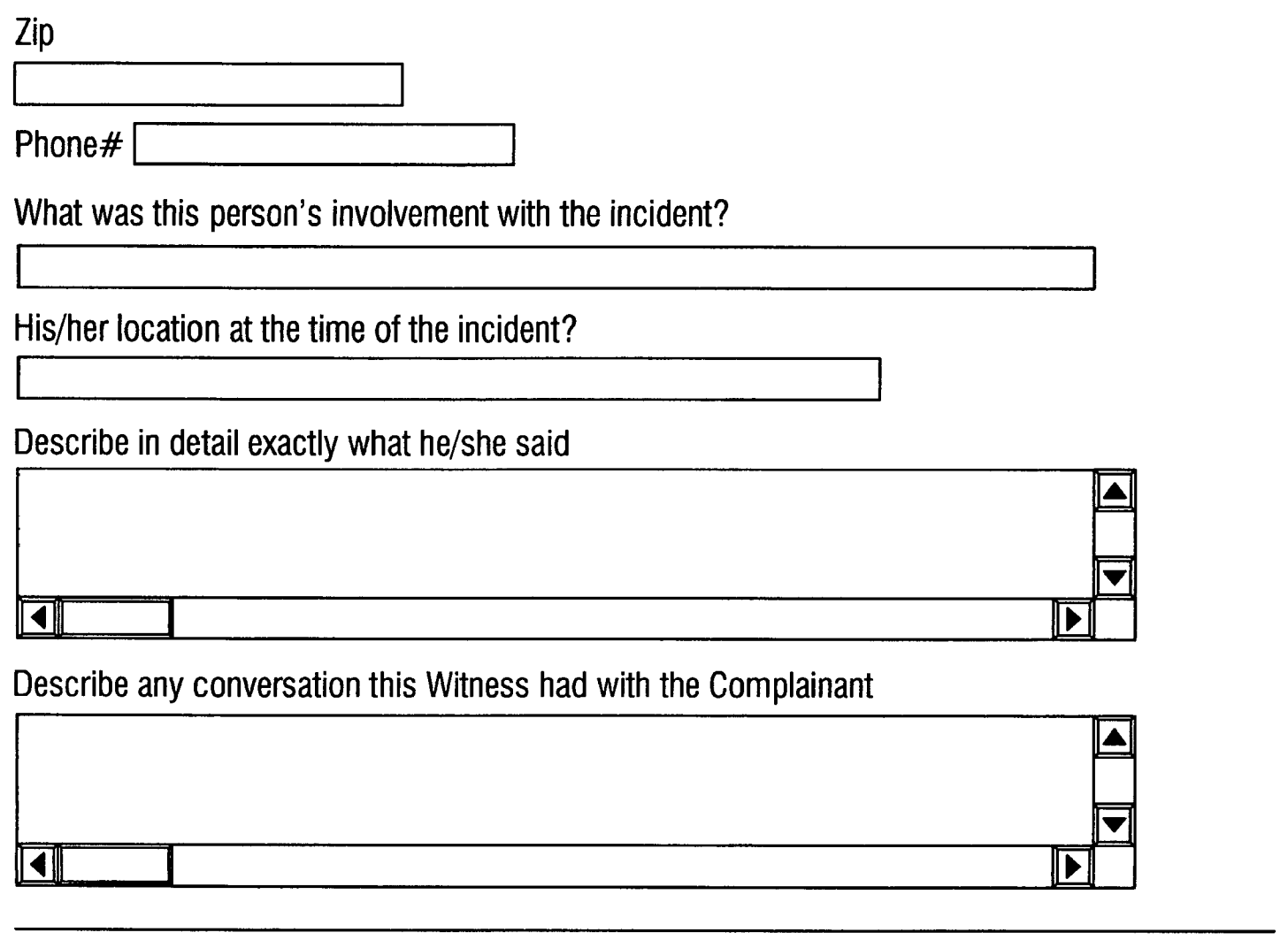
Figure 16M:
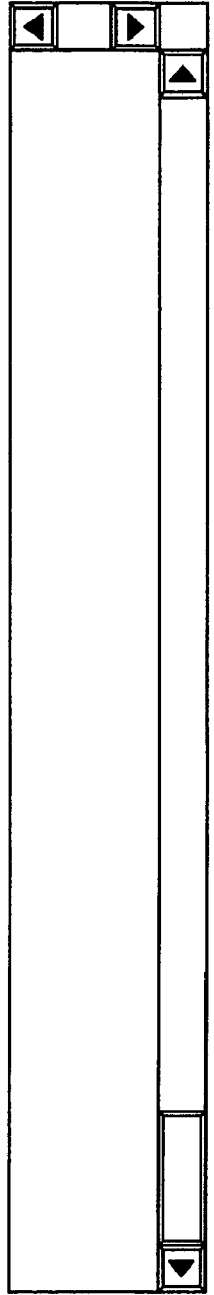

Now referring to FIGS. 16A-16N, an example of a printout of a computer screen showing a more detailed Incident Investigation Report (IIR) form is provided. FIGS. 16A-16N together show the blank form of the IIR provided to officer 701 when officer 701 clicks on the Enter Events function in the options menu of the Officer Console.

Figure 17:
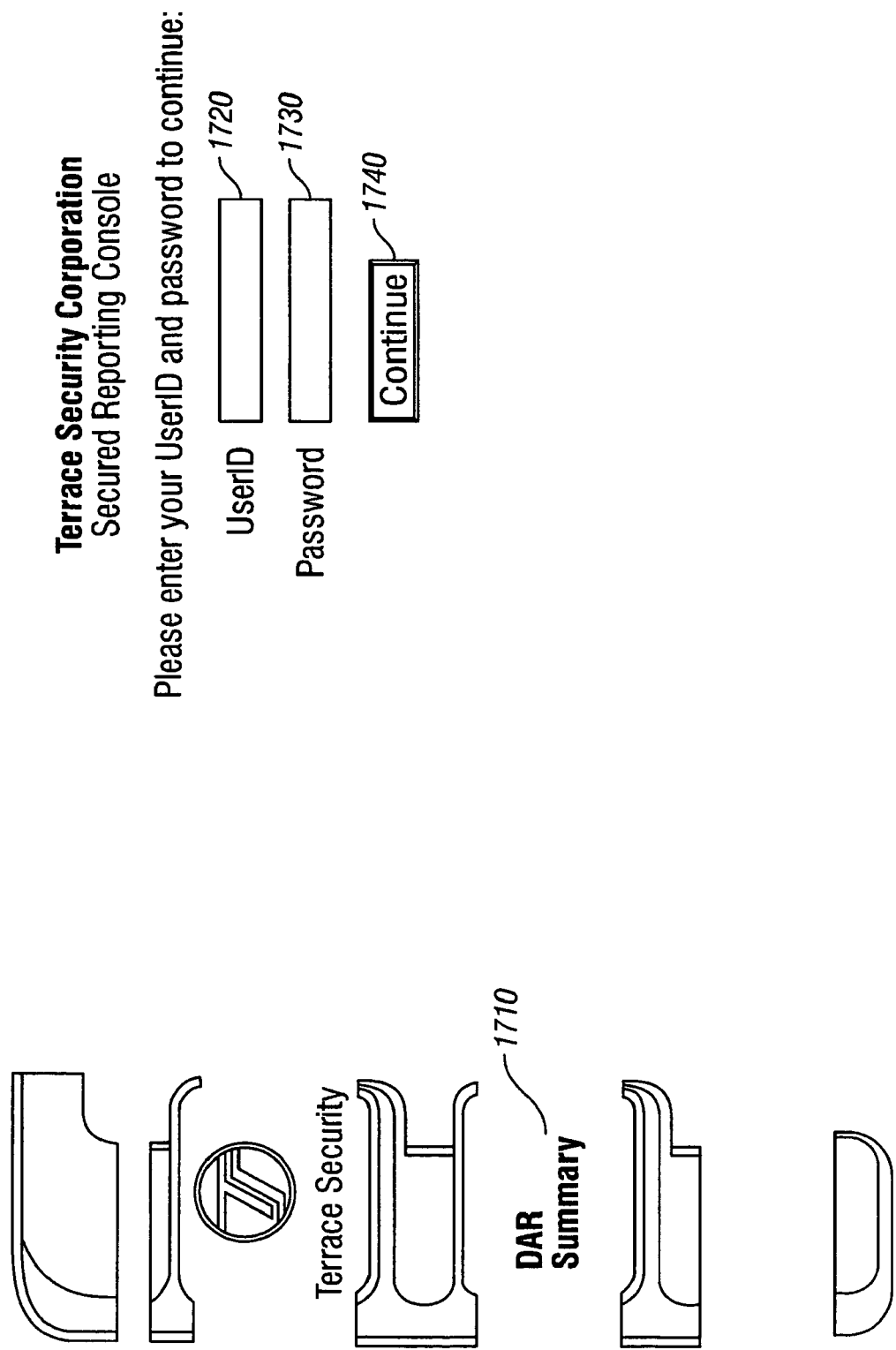
FIG. 17 is a printout of a computer screen from a web site in accordance with a preferred embodiment of the present invention.

Referring now to FIG. 17, a printout of a computer screen presented to a client using the Web site of computer 15 is shown. After the client clicks on the "Client Console" choice in the menu 201, as is shown in FIG. 2, the client is provided with a display of a screen such as is shown in FIG. 17. In the screen shown in FIG. 17, there is a menu 1710, as well as data fields 1720 and 1730 for the client to enter a user identifier (in the "UserID" field 1720) and a password (in the "Password" field 1730). Once the client has entered an appropriate user identifier and password, the client clicks on the "Continue" button 1740 to send the data to the Web site for verification. Once the Web site has verified the user identifier and password received, then the user is provided with access to DARs submitted by officers for properties associated with the client.

Figure 18:
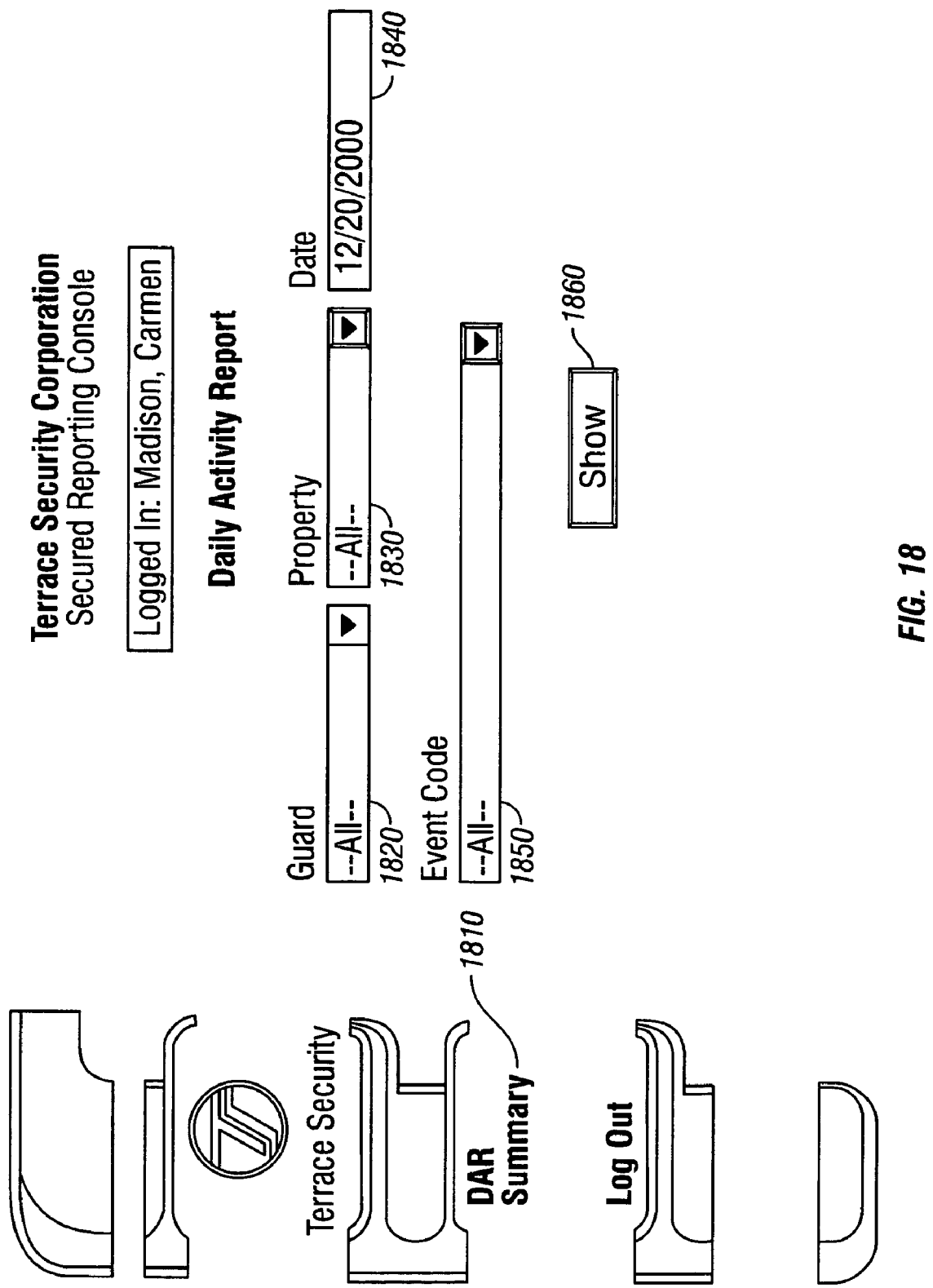
FIG. 18 is a printout of a computer screen from a web site in accordance with a preferred embodiment of the present invention.

Now referring to FIG. 18, a screen provided to an authorized client user, who has submitted an appropriate user identifier and password, is shown. In FIG. 18, the screen provides a menu 1810, as well as data fields 1820, 1830, 1840, and 1850. As shown in FIG. 18, drop-down menus are provided for data fields "Guard" 1820, "Property" 1830, and "Event Code" 1850. A data field 1840 for the date is also provided. The client may enter search criteria in any or all of data fields 1820, 1830, 1840, or 1850. Once the client has entered the desired search criteria in any one or more of data fields 1820, 1830, 1840, or 1850, the client can then clock on the "Show" button 1860. At that point, the search criteria data is sent to the computer 15. The computer software 33 is programmed to search database 35 for a match for the DARs which have data matching some or all of the search criteria data received. Once the search of database 35 is completed, the computer software 33 is programmed to send the results of the search to the user where the results are displayed on the client computer 20 or 22.

In an alternative embodiment of the present invention, multiple classes of client users can be defined. For example, software 33 can be programmed to define a client administrator which can be added to the database 35 by the system administrator. The software 33 can be programmed so that a client administrator can log onto web site 15 and, once recognized as a client administrator by the software 33 (such as by providing a proper password or other authenticating identifier), can add, modify, or delete information from the database 35. For example, it may be desirable for a client to have the ability to add or delete authorized client users from the database 35. This would be appropriate when the client desires to give access to the information on the database 35 to one or more client employees, or to restrict certain of the client information on the database 35 to only one or more client users. In addition, if one of the client user's employees terminates the employment relationship with the client, the client may wish to delete that client user from the list of client users authorized to access the client information on the database 35. Similarly, if desired, software 33 can be programmed to define different classes of users, with differing access to the information in database 35 and/or differing rights to add, modify, or delete information in database 35.

Figure 19B:
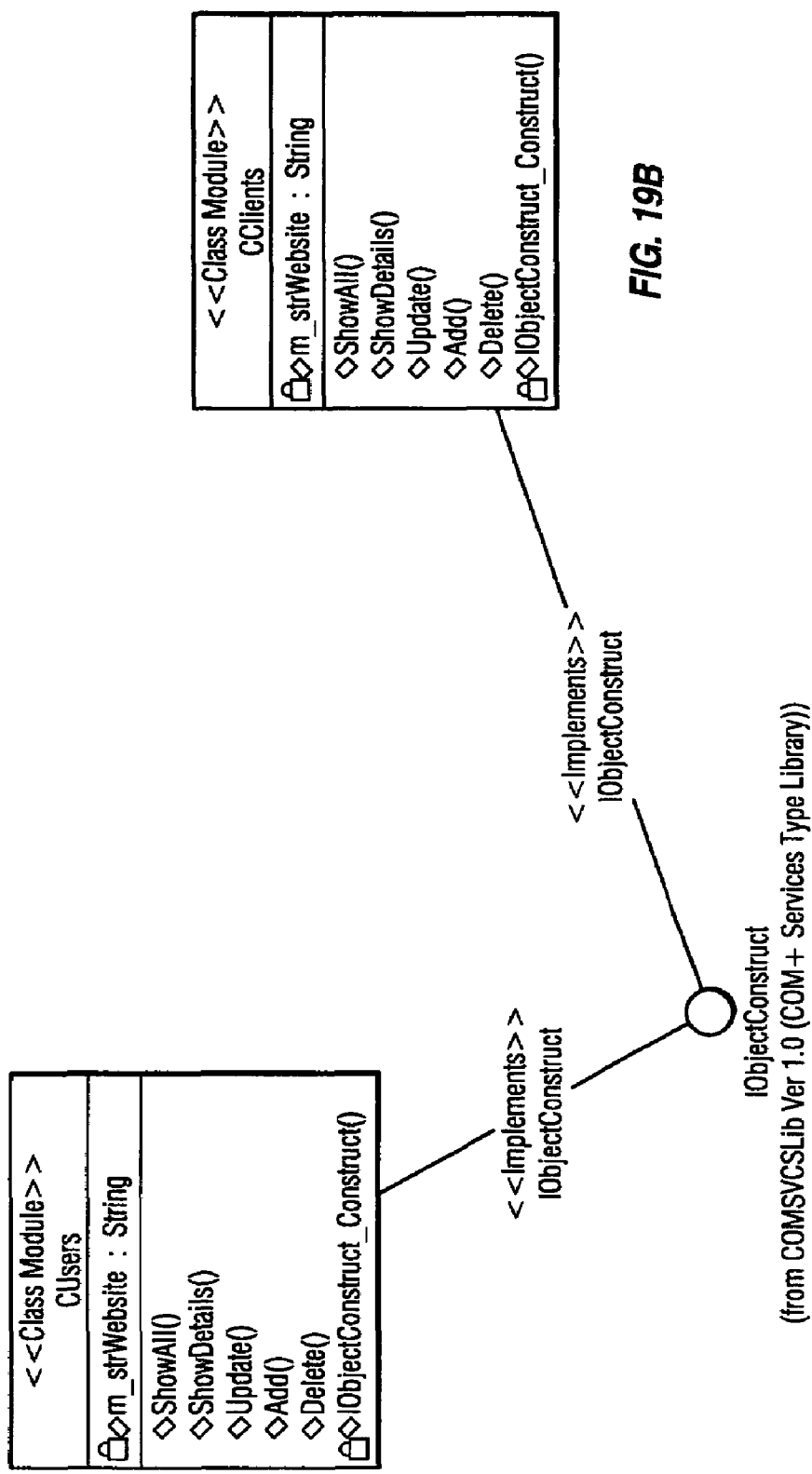
Figure 19C:
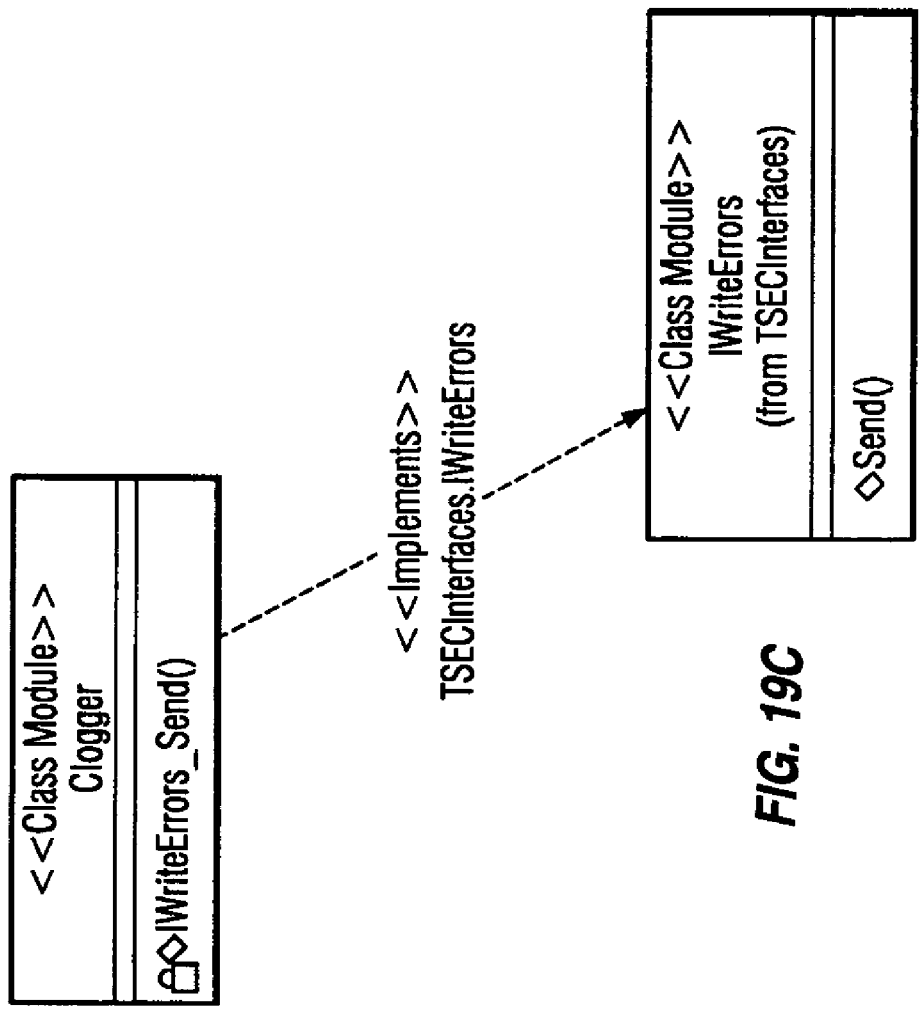
Figure 19D:
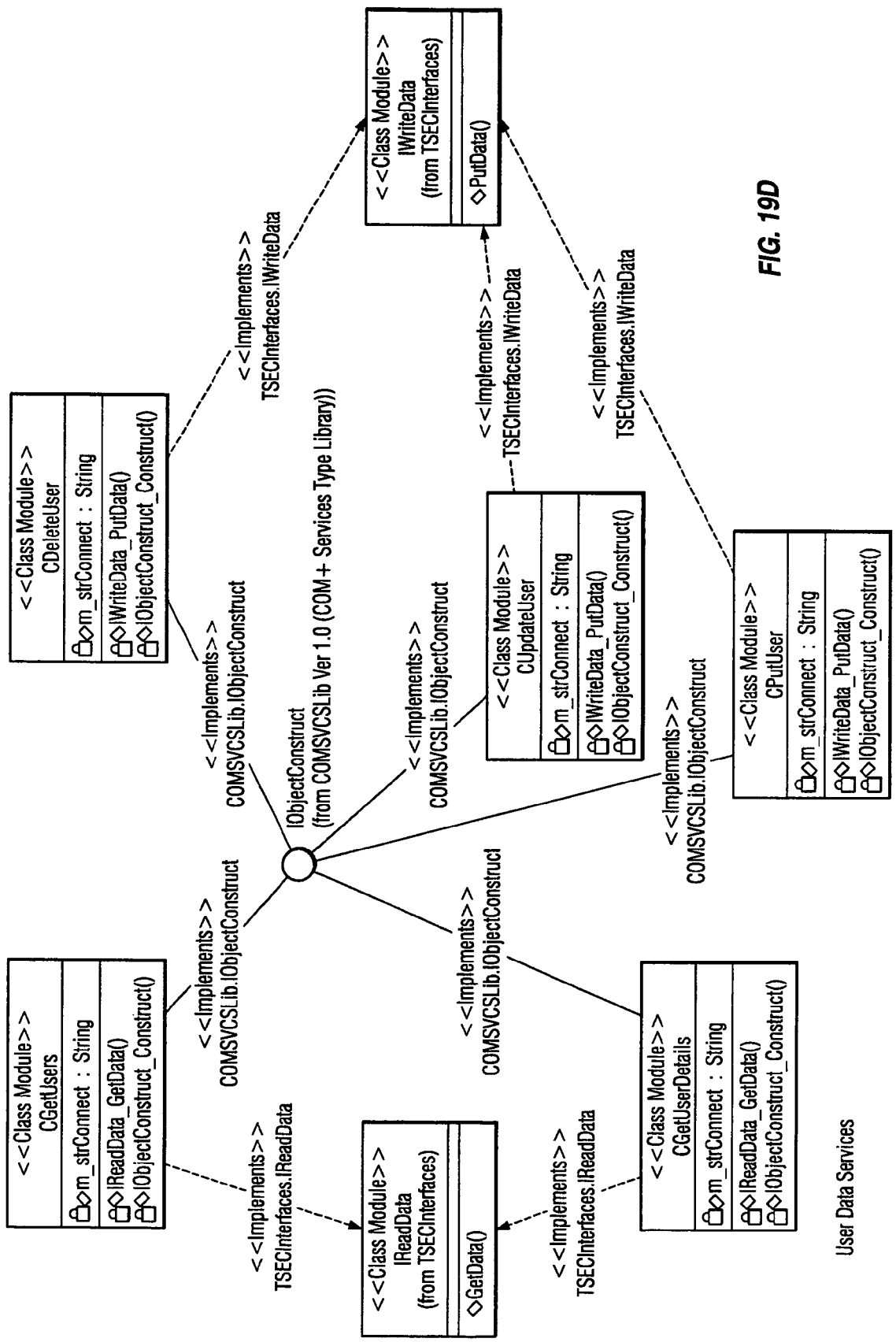
Figure 19E:
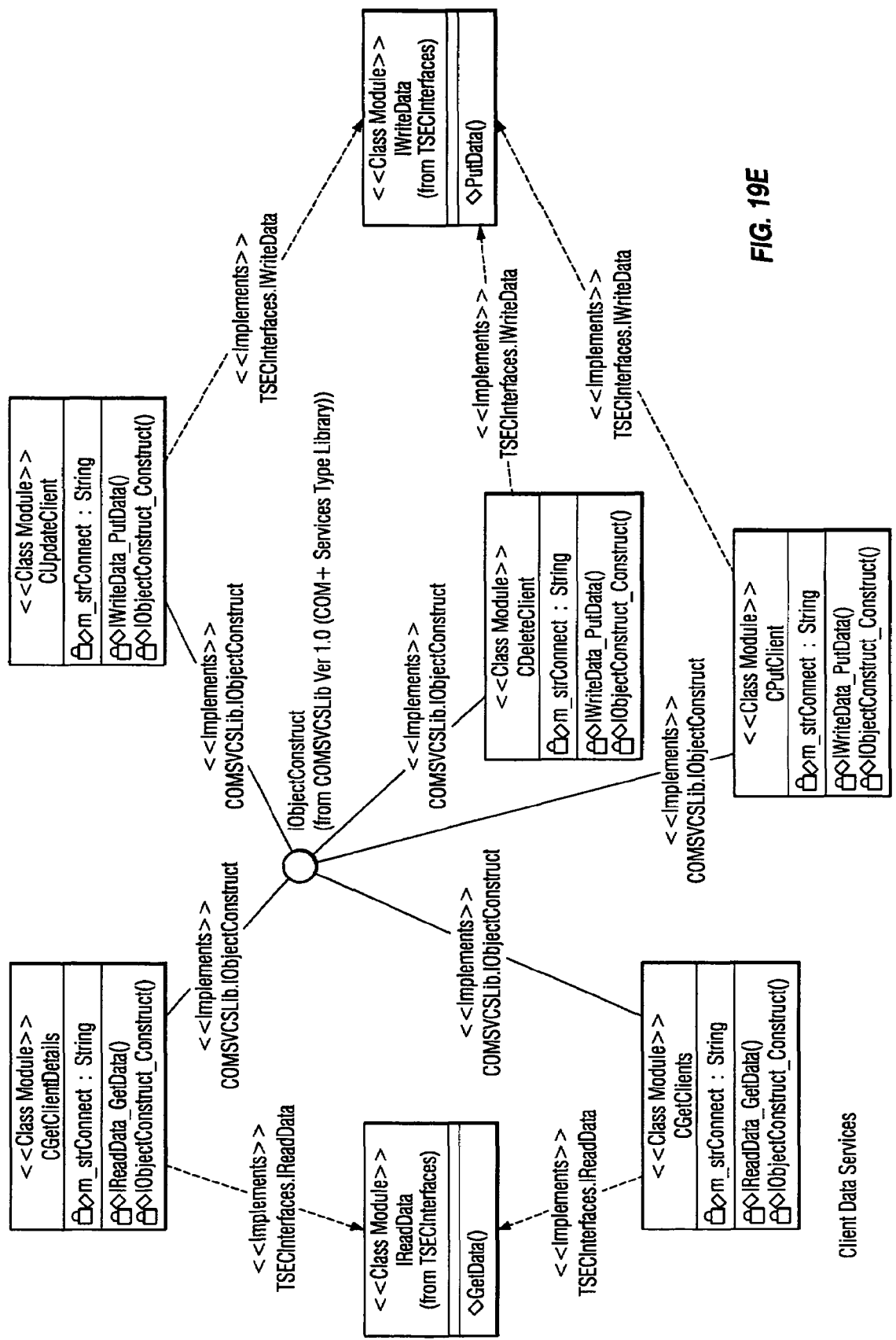
Figure 19G:
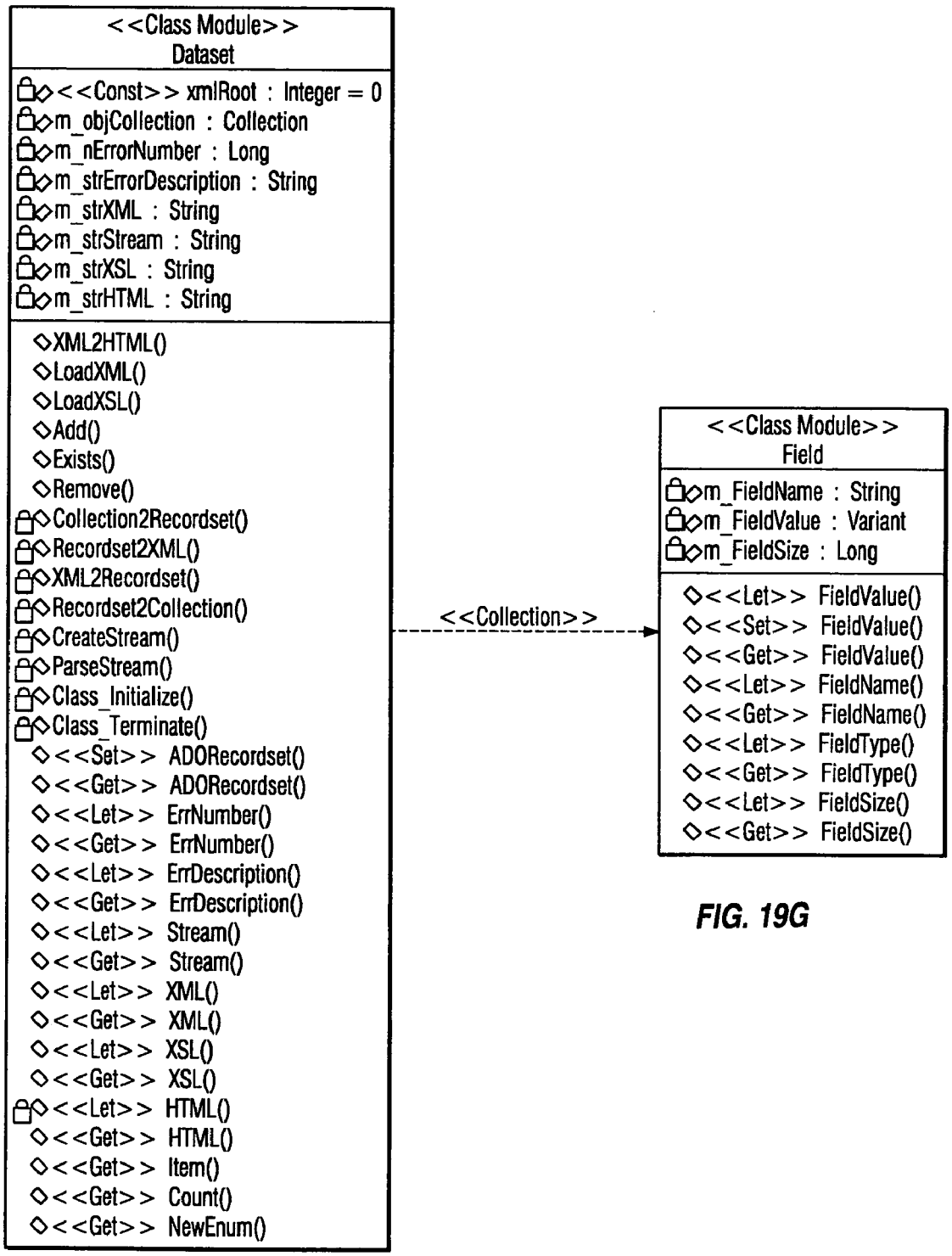
Figure 19H:
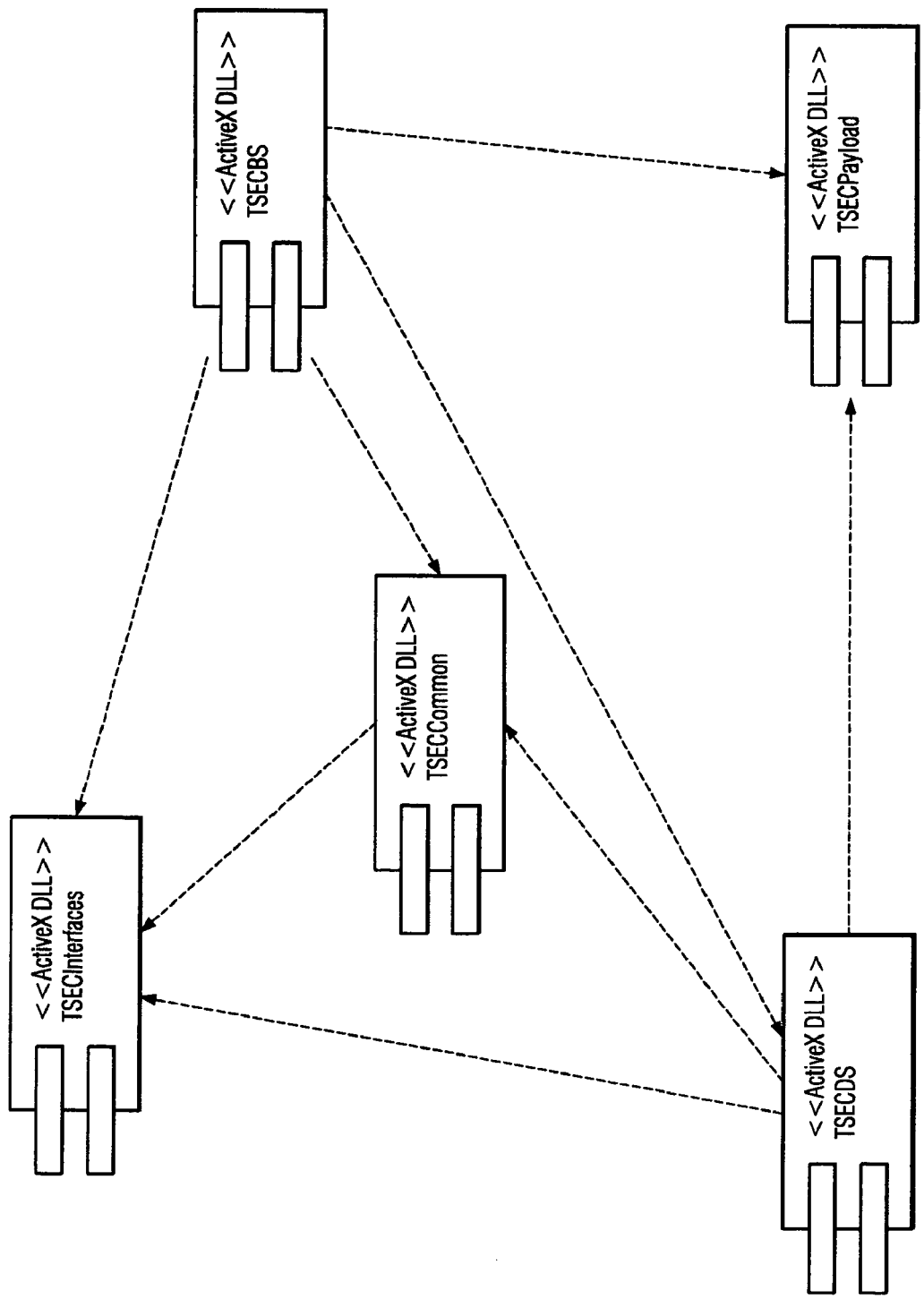

Referring now to FIGS. 19A-19H, documentation describing the software 33 and its programming is provided. FIG. 19A provides a database diagram for information relating to clients, users, and properties related to the security services provided. FIG. 19B provides documentation for business services. FIG. 19C provides documentation for error logging by the software 33. FIG. 19D provides documentation for user data services performed by software 33, while FIG. 19E provides documentation for the programming of software 33 and its handling of client data. FIG. 19F provides documentation for interfaces and event classification of software 33. FIG. 19G provides documentation for datasets and fields used by software 33. FIG. 19H provides documentation for the dll files used by software 33 and the relationship of such files.

Although the embodiment described herein uses Web technology to disseminate information, any of a variety of document types and electronic dissemination technologies can be used. For example, the documents may be in the form of hypertextual e-mail messages that are disseminated by a list server, or PUSH documents disseminated by a PUSH server. As interactive television, video-on-demand, and Web TV technologies continue to evolve, it is contemplated that the "documents" will include video clips that are displayed to the client on a computer 20 or on a television screen. Further, although hypertextual documents are preferably used, it is possible to use non-hypertextual documents (including paper-based documents) that simply instruct the user to manually enter the appropriate URL (including the referral information) into a browser program. In addition, although the system is described in the context of "the" Web site, it should be recognized that a given user can disseminate documents from multiple different sites, including sites that use different document formats and transfer protocols.

In another embodiment of the present invention, closed circuit cameras can be used to monitor a client's facilities. Such cameras, and the equipment and software to provide visual images to a command center where a security officer can view the images, for example, is conventional. According to the present invention, however, one or more digital cameras can be placed at preselected locations in and around a client's facility. Such cameras may provide only visual images or may be used to provide audiovisual footage. Many types of conventional video cameras are readily available. We prefer to use a SDII CSC WV-CP460 Series camera. We also prefer to secure the cameras using a mounting which can rotate the camera (to effectively increase its field of vision) and also move the camera up and down (also to effectively increase its field of vision). Such cameras, as well as the controllable mountings, are commercially available from Panasonic.

In accordance with the present invention, cameras at a particular site can be connected to computer 1, for example, which corresponds to that site. It will be appreciated that the cameras may be located at a variety of locations remote from computer 1. The images from the cameras can be transmitted automatically to computer 15 from computer 1 via the Internet 10. Computer 15 can be programmed to automatically update the Web site with the images (whether still or moving) transmitted by computer 1. Computer 15 also can be programmed to use PUSH technology to transmit the updated images from the Web site to a corresponding client by transmitting the images to computer 20 via the Internet 10. Alternatively, a client can use computer 20 to request the images by transmitting the request from computer 20 to computer 15 via the Internet 10. In one preferred embodiment, the visual images from the cameras are provided to the computer 15 which is connected to the Internet 10. A client can then connect the client's computer 20 to the Internet 10 through a browser and then connect to the Web site which contains the visual images. In still another aspect of the invention, the Web site can provide the client with the ability to select particular cameras for viewing, control the movement of the cameras, and selectively record the feed from one or more cameras. While we prefer to provide such access to a client over the Internet 10 via the Web site, it will be understood that other conventional means can be used by a client to remotely access the computer, such as a dial-up modem connection.

In addition to visual images or audiovisual footage from the cameras, the present invention allows for providing additional information to the client via the web site or other remote connection. For example, e-mail links can be provided to allow the client to easily and quickly send e-mails to a security officer at the command center, or elsewhere, for that matter. Similarly, computer 15 can be programmed to notify a given client of the availability of updated information on the Web site. For example, a client may specify that the client wants to be notified as soon as possible of any new incidents of vandalism. Given such a request, computer 15 can be programmed so that, whenever a new incident report involving vandalism is transmitted to computer 15, and the Web site is updated to include the new report, computer 15 automatically sends an e-mail message (or other message) via Internet 10 to computer 20 corresponding to the client which previously made the request.

To prevent unauthorized access to the visual images and other information, various security measures can be used. Among others, password protection can be used to require any remote user to correctly provide one or more passwords. I prefer to use the following approach to ensure a secure connection: embedded scripts, NTFS Windows, NT file structure security, and secured certificates.

To ensure that data from the Web site is available via the Internet 10 to only clients of the security services involved requires that the database and the Web site be protected. Similarly, the data transmitted over the Internet 10 should be protected in order to ensure privacy and confidentiality. A wide variety of conventional security measures can be used. We prefer to use secure socket layer (SSL) protection. The SSL protocol provides privacy and reliability between two communicating applications, such as the browsers of computer 15 and computer 20. The SSL handshake protocol allows the server and client (for example, computer 15 and computer 20, respectively) to authenticate each other and negotiate an encryption algorithm and cryptographic keys before the application protocol transmits or receives data. When the SSL is used, the transmitting computer 15 fragments the data to be transmitted into manageable-sized blocks (sometimes compressing the data if desired), applies a message authentication code, encrypts, and then transmits the result. When the data is received the receiving computer decrypts the data, verifies the sender, decompresses the data (if it was compressed), reassembles the data, and then delivers the result to higher level clients (such as the browser of computer 20). SSL protection is commercially available and easily implemented on the Web site of computer 15.

3. Description of Other Aspects of the Invention

The present invention provides for much more client involvement in connection with the security services. Among other things, a client can specify the apparel to be worn by the security officers providing security on or around the client's premises. The client can thus decide the extent to which the client desires high visibility of the security officers or desires that the security officers dress more like the client's employees, tenants, or the like. Such client choices can be extended beyond apparel to the vehicles used by security officers, and to site specific training and client interaction in post order development.

In another aspect of the invention, the client is involved in selecting the individuals who will provide security services to the client. For example, the security service officers may be interviewed by one or more client representatives. Such interviews can be formal or informal, short or longer in duration, and can include management of the security service provider. From one or more such interviews, the client can be allowed to select the individuals to provide security services to the client. Alternatively, the client may use the interviews to decide which individuals will not be used to provide security services to the client. Either way, the client is involved in the process of determining which individuals will provide security services to the client.

One aspect of the present invention involves personality profiling. According to the present invention, a candidate for a position as a security officer (who is to provide security services to a client) is given a conventional personality profiling test. Various tests have been developed for personality profiling in the past. Ideally, the personality profiling test considers and tests for at least the following personality characteristics: dominance, influence, conscientiousness, and steadiness. A personality profiling test which tests for these features is commercially available from the Carlson Learning Company of Minneapolis, Minnesota. This particular test is also helpful because it provides "standard" profile patterns of different personalities, labeled as achiever, agent, appraiser, counselor, creative, developer, inspirational, investigator, objective thinker, overshift, perfectionist, persuader, practitioner, promoter, result-oriented, specialist, tight, and undershift.

In addition, the potential position for a security officer is profiled. The profiling of a position is preferably done with input from the client. Such input preferably includes information about the following characteristics of the position: dominance, influence, conscientiousness, and steadiness. Such information also preferably includes information about the client and the client's representatives with whom the security officer will likely have dealings: such as client values, vision, and mission. Once such information has been gathered, a personality profile for the "ideal" hypothetical person to fill the position can be generated. Such profiling can be based on the location(s) where the officer is to be, as well as the time of day or night the officer is to work. I have found that the same position may have different "ideal" personality characteristics depending on the time of day or night the officer is to be working.

Once a candidate's personality characteristics have been profiled, the candidate's profile is then compared to the "ideal" profile for available security officer positions. In accordance with the present invention, it is desirable to try to match a candidate's personality profile as closely as possible to a profile for a security officer position. An acceptable match can be obtained using the Carlson Learning Company's personality profiling test, which is conventional and commercially available.

Figure 20:
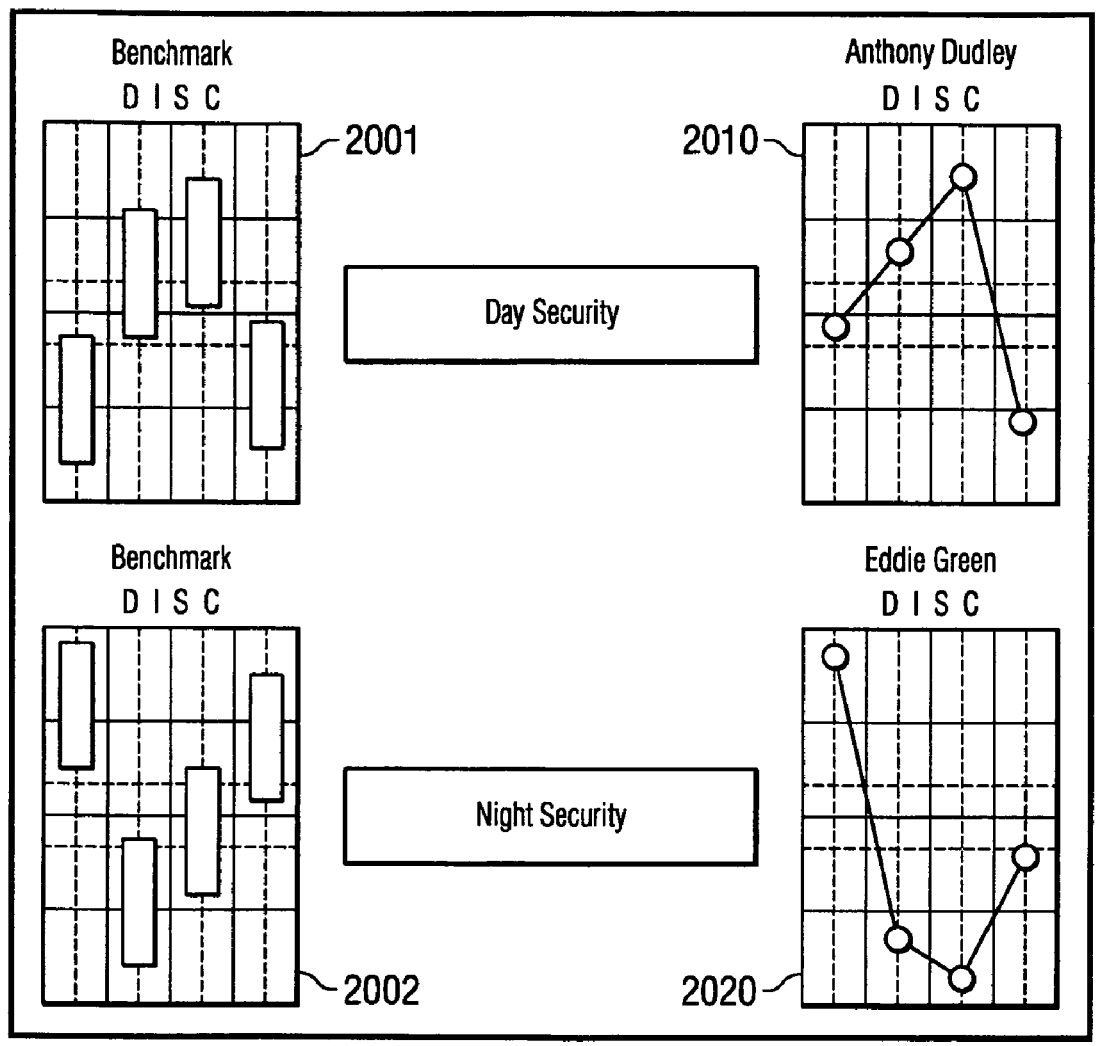
FIG. 20 shows the use of personality profiles in accordance with one aspect of the present invention.

FIG. 20 illustrates how different officers may be matched to different shifts by use of personality profiling. In FIG. 20, a benchmark 2001 for day security and benchmark 2002 for night security at a particular location have been generated, such as by conducting interviews with a client as to the needs of the client. It can be seen that the profile 2010 of officer Dudley nicely matches the benchmark 2001 profile for day security. Although not a perfect match, it can also be seen from FIG. 20 that Officer Green's profile 2020 better matches the benchmark 2002 for night security than does the profile 2010 for Officer Dudley.

In addition to client involvement in determining the individuals to provide the security services, and the apparel, vehicles, and other aspects of the services, the present invention also provides for client involvement in determining the nature and extent of training to be received by the individuals who are selected to provide security services to the client. In accordance with the present invention, the training manual and instructions are divided into various modules, such as the following: Securing/Un-securing property (such as by building type or business type, and/or such as by time, such as business hours, after hours, holidays, or weekends), Access Control (such as by contractors, visitors, vendors, solicitors, after hours access, control system usage and operation, and the like), Parking Enforcement (such as by type of parking facility, delivery lane/loading dock usage, fire lane, and handicapped parking, and the like), Closed Circuit television operation and usage, Elevators (such as operation, usage, malfunctions, entrapments, deliveries, after hours use, and the like), Tenant Relations (such as escorts, vehicle assistance, newspaper/mail deliveries, lockouts, night letters/deliveries, after hours access, and the like), Patrol Functions (such as business hours versus after hours), Hazard Identification (such as control procedures, property condition logs/reports, light reports, and the like), Housekeeping (such as key procedures, access, and the like), and Fire Command room (such as equipment familiarity, elevator operation, alarm systems, and the like). The client is provided with the written instructional materials for various modules and is allowed to select which modules, in addition to basic training, which is to be received by the individuals who will provide security services to the client. In another aspect of the invention, the training materials and instruction can be modified to include training specific to the client and the client's needs. Such client information preferably includes information and materials like the following: emergency response training (including fire system operation, central plant shutdown, emergency generator/equipment operation, emergency elevator operation), advanced customer service training, accident investigation training, and incident investigation training.

4. Conclusion

While the present invention has been shown and described in its preferred embodiment and in certain specific alternative embodiments, those skilled in the art will recognize from the foregoing discussion that various changes, modifications and variations may be made thereto without departing from the spirit and scope of the invention as set forth in the claims. For example, one of ordinary skill will appreciate that the graphic user interface (GUI) described and shown in various figures can be easily modified to look differently. Similarly, one of ordinary skill will appreciate that the information provided to a user (such as via the GUI) can include more or less information than that provided in the foregoing examples and description of the preferred embodiment of the present invention. Similarly, one of ordinary skill will appreciate that the software used to maintain and search the database, or to provide security for the web site, or to allow officers to generate and submit daily activity reports, incident reports, or other information, can be modified without departing from the spirit and scope of the present invention. Hence, the specific embodiments and any specific components and the like are merely illustrative and do not limit the scope of the invention or the claims herein.

We claim:

1. A method of providing private security services comprising:
   providing an electronic security system comprising a processing unit for facilitating electronic communication through a computer network with at least one remote computer located at one or more remote locations, said security system further comprising at least one storage device for receiving and storing information pertaining to private security services provided at said one or more remote locations by one or more private security officers;
   receiving security data entered into said at least one remote computer at one or more remote locations by said one or more private security officers, said security data pertaining to at least one security related event;
   receiving timekeeping data pertaining to a portion of one or more security officer's work shifts at a remote location; and
   wherein said system is programmed to not accept timekeeping data entered into said at least one remote computer by said security officer without first receiving said security data from said security officer.

2. The method of claim 1, wherein said security data comprises text files, visual images, video, or audio data pertaining to at least one security event.

3. The method of claim 1, wherein said timekeeping data further comprises clock-in data pertaining to a beginning of a work shift.

4. The method of claim 3, wherein said timekeeping data further comprises clock-out data pertaining to an end of said work shift.

5. The method of claim 4, further comprising the additional step of providing a graphic user interface for entering security data and timekeeping data into said at least one remote computer.

6. The method of claim 5, wherein said graphic user interface further comprises one or more daily activity report templates having one or more data fields for security data.

7. The method of claim 6, further comprising the additional step of updating said storage device with said security data and said timekeeping data received from one or more remote locations.

8. The method of claim 5, further comprising the additional steps of:
   receiving log-in information entered into said at least one remote computer by said one or more security officers through said computer network;
   creating a record of the time at which said officer logs into the system;
   generating clock-in data pertaining to a beginning of a work shift; and
   associating said clock-in data with said security officer who entered said log-in information.

9. The method of claim 8, further comprising the additional steps of:

receiving log-out information entered into said at least one remote computer by said security officer through said computer network;

creating a record of the time at which said officer logs out of the system;

generating clock-out data pertaining to an end of a work shift; and associating said clock-out data with said security officer who entered said log-out information.

10. The method of claim 9, further comprising the additional step of:

refusing to allow said security officer to log out of the system until a daily activity report has been submitted.

11. The method of claim 1, wherein said security data comprises a daily activity security report.

12. A security system comprising:

a processing unit for facilitating electronic communication through a computer network with one or more remote computers located at one or more remote locations, said security system further comprising at least one storage device for receiving and storing information pertaining to private security services provided at said one or more remote locations by one or more private security officers, wherein said processing unit is for receiving security data entered into one or more remote computers at a remote location by said one or more private security officers, said security data pertaining to at least one security related event at said remote location, and for receiving timekeeping data pertaining to a portion of one or more security officer's work shifts at a remote location; and wherein said system is programmed to not accept said timekeeping data entered into said remote system by said security officer without first receiving said security data from said security officer.

13. The security system of claim 12, wherein said security data comprises at least one of text files, visual images, video, and audio data.

14. The security system of claim 12, wherein said timekeeping data further comprises clock-in data pertaining to a beginning of a work shift.

15. The security system of claim 14, wherein said timekeeping data further comprises clock-out data pertaining to an end of the work shift.

16. The security system of claim 12, wherein said remote computer at said remote location utilizes a graphic user interface adapted to receive security data and timekeeping data.

17. The security system of claim 16, wherein said graphic user interface further comprises one or more daily activity report templates having one or more data fields adapted to receive security data.

18. The security system of claim 17, wherein said processing unit is adapted to update said storage device with said security data and said timekeeping data received from said one or more remote computers.

19. The security system of claim 12, wherein said security data comprises a daily activity security report.

20. The security system of claim 19, wherein said processing unit is adapted to receive log-in information entered into a remote computer by said security officer through said computer network, create a record of the time at which said officer logs into the system, generate clock-in data pertaining to a beginning of a work shift, and associate said clock-in data with said security officer who entered said log-in information.

21. The security system of claim 20, wherein said processing unit is adapted to receive log-out information entered into a remote computer by said security officer through said computer network, create a record of the time at which said officer logs out of the system, generate clock-out data pertaining to an end of a work shift, and associate said clock-out data with said security officer who entered said log-out information.

22. The security system of claim 21, wherein said processing unit is adapted to refuse to allow said security officer to log out of the system until a daily activity report has been submitted.

23. A method of providing private security services comprising:

providing an electronic security system comprising a processing unit for facilitating electronic communication through a computer network with one or more remote computers located at one or more remote locations, said security system further comprising at least one storage device for receiving and storing information pertaining to private security services providing at said one or more remote locations by one or more private security officers;

receiving security data entered into one or more remote computers at one or more remote locations by said one or more private security officers, said security data pertaining to at least one security related event;

receiving timekeeping data pertaining to a portion of one or more security officer's work shifts at a remote location, wherein said timekeeping data further comprises clock-in data pertaining to a beginning of a work shift and clock-out data pertaining to an end of the work shift;

providing a graphic user interface for entering security data and timekeeping data into said one or more remote computers, said graphic user interface having one or more daily activity report templates having one or more data fields for security data; and refusing to allow said security officer to log out of the system until a daily activity report has been submitted.

* * * * *